United States Patent
Nitta et al.

(10) Patent No.: US 7,859,447 B2
(45) Date of Patent: *Dec. 28, 2010

(54) IMAGE PROCESSING METHOD, SEMICONDUCTOR DEVICE FOR DETECTING PHYSICAL QUANTITY DISTRIBUTION, AND ELECTRONIC APPARATUS

(75) Inventors: Yoshikazu Nitta, Tokyo (JP); Noriyuki Fukushima, Kanagawa (JP); Yoshinori Muramatsu, Kanagawa (JP); Yukihiro Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 866 days.

This patent is subject to a terminal disclaimer.

(21) Appl. No.: 11/179,907

(22) Filed: Jul. 12, 2005

(65) Prior Publication Data

US 2006/0012507 A1  Jan. 19, 2006

(30) Foreign Application Priority Data

Jul. 16, 2004  (JP)  ............................ P2004-209888

(51) Int. Cl.
*H03M 1/34*  (2006.01)

(52) U.S. Cl. ...................................... 341/164; 341/156
(58) Field of Classification Search ......... 341/155–165, 341/172, 110, 118–125; 382/293, 305; 348/297, 348/307, 294
See application file for complete search history.

(56) References Cited

U.S. PATENT DOCUMENTS 5,877,715 A * 3/1999 Gowda et al. ................ 341/122
6,204,795 B1 * 3/2001 Afghahi ....................... 341/166

\* cited by examiner

*Primary Examiner*—David L Ometz
*Assistant Examiner*—Antoinette T Spinks
(74) *Attorney, Agent, or Firm*—SNR Denton US LLP

(57) ABSTRACT

An image processing method for obtaining digital data comprising the steps of obtaining a plurality of image signals under a condition of different accumulation periods as an initial value for a counting operation, comparing, by using digital data for a first image signal of the plurality of image signals, an electric signal corresponding to a second image signal of the plurality of image signals with a reference signal, obtaining digital data for the second image signal, performing a counting operation in a mode having the same sign as the sign of digital data for the first image signal between a down-counting mode and an up-counting mode while the comparing step is being performed, and storing a count value.

13 Claims, 12 Drawing Sheets

IMAGE PROCESSING METHOD, SEMICONDUCTOR DEVICE FOR DETECTING PHYSICAL QUANTITY DISTRIBUTION, AND ELECTRONIC APPARATUS

CROSS PREFERENCE TO RELATED APPLICATIONS

The present claims the benefit of Japanese Patent Application JP 2004-209888 filed in the Japanese Patent Office on Jul. 16, 2004, the entire contents of which are incorporated herein by reference.

FIELD OF THE INVENTION

The present invention relates to an image processing method, a semiconductor device for detecting the physical quantity distribution in which a plurality of unit elements are disposed, and an electronic apparatus. More specifically, the invention relates to a digital signal processing technology suitably used for semiconductor devices for detecting the physical quantity distribution, for example, solid-state imaging apparatuses, and other electronic apparatuses, in which a plurality of unit elements responsive to electromagnetic waves, such as light or radiation, input from an external source, are disposed, and the physical quantity distribution obtained by converting electromagnetic waves into an electric signal by the unit elements can be selectively read by address control as the electric signal. More particularly, the invention pertains to a technology for increasing the dynamic range.

DESCRIPTION OF THE RELATED ART

Semiconductor devices for detecting the physical quantity distribution in which a plurality of unit elements (for example, pixels) responsive to electromagnetic waves, such as light or radiation, input from an external source, are disposed in a line or a matrix are used in various fields.

In the video equipment field, CCD (Charge Coupled Device), MOS (Metal Oxide Semiconductor), or CMOS (Complementary Metal-oxide Semiconductor) solid-state imaging apparatuses for detecting light (an example of electromagnetic waves) as the physical quantity are used. Such imaging apparatuses read the physical quantity distribution obtained by converting light into an electric signal by using the unit elements (pixels in the solid-state imaging apparatuses) as the electric signal.

Solid-state imaging apparatuses include amplifying solid-state imaging apparatuses. Amplifying solid-state imaging apparatuses have pixels formed of amplifying solid-state imaging devices (APS; Active Pixel Sensors/also referred to as "gain cells") having amplifying driving transistors in pixel signal generators for generating pixel signals according to signal charge generated in charge generators. For example, many CMOS solid-state imaging apparatuses have such a configuration.

In this type of amplifying solid-state imaging apparatus, to read out pixel signals to an external source, address control is performed on a pixel portion in which a plurality of unit pixels are disposed so that the signals are selectively read from the individual unit pixels. That is, the amplifying solid-state imaging apparatus is an example of an address-control solid-state-imaging apparatus.

For example, in an amplifying solid-state imaging device, which is one type of X-Y address solid-state imaging device having unit pixels disposed in a matrix, MOS-structured active devices (MOS transistors) are used for forming the pixels so that the pixels themselves have an amplifying function. That is, signal charge (photoelectrons) stored in photodiodes, which are photoelectric conversion devices, is amplified by the active devices and the amplified signal charge is read as image information.

In this type of X-Y address solid-state imaging device, for example, many pixel transistors are disposed in a two-dimensional matrix to form a pixel portion, the accumulation of signal charge in accordance with incident light in each line (row) or each pixel is started, and current or voltage signals based on the accumulated signal charge are sequentially read from the individual pixels by addressing. In MOS (including CMOS) solid-state imaging devices, an address control method for accessing the pixels in one row at one time and reading the pixel signals from the pixel portion in units of rows is mostly used.

The analog pixel signal read from the pixel portion is converted into digital data in an analog-to-digital converter (AD converter) if necessary. Accordingly, various AD conversion mechanisms have been proposed. In some of the known publications, in accordance with the method for accessing the pixels in one row at one time and reading the pixel signals from the pixel portion, a so-called column parallel system in which an AD converter and a signal processor for performing signal processing other than AD conversion are disposed for each vertical column is employed.

Various types of processing are executed on pixel signals output from the pixels to generate high-quality images or to use the pixel signals for special applications. Those types of processing largely include a first processing method for processing pixel signals in an analog area and then converting the pixel signals into digital data, and a second processing method for converting the analog pixel signals into digital data and then performing computation (digital computation) on the digital data.

In terms of the circuit arrangement for performing computation processing, a method for performing computation processing outside the device (outside the chip) (off-chip method) is known in the related art. A method for providing various processing functions, such as an addition/subtraction function, on the image sensor (such a technique is referred to as the "on-chip method") is known in the related art. In particular, it is considered that a so-called "column parallel system" structure in which a signal processor is disposed in each vertical column for reading pixel signals from the pixel portion is suitable for the on-chip method.

As a case where pixel signals are processed in an analog area and the on-chip method is applied, the following mechanism is known in the related art. By using the capacity within a pixel as an inter-pixel memory, the previous frame signal is stored and is added to the current frame signal in the pixel, thereby increasing the dynamic range. A mechanism for performing wide dynamic range imaging by using dual sampling is known in the related art.

FIG. 12 illustrates a method for increasing the dynamic range for the light quantity in the related art. In this method, sampling circuits (column circuits; first and second horizontal transfer registers) are disposed, as shown in FIG. 12, across an imaging area. Signal charge read from pixels of a row n and a row n-Δ which are displaced from each other by Δ are independently read out to the corresponding sampling circuits and are stored as signals of output 1 and output 2.

After resetting the pixels of a scanned row, the accumulation of signal charge is restarted. Accordingly, if the scanning direction of the imaging plane is from the bottom to the top, the accumulation periods of the row n and the row n-Δ have a predetermined relationship based on the frame rate and the number of scanning lines, and by adjusting the interval between two rows to be read, the ratio of the accumulation periods of the signals of the two rows can be changed. For example, if the ratio of the n-Δ row and Δ is set to be 100:1, a short-period accumulation signal and a long-period accumulation signal whose accumulation periods are different from each other by the factor of 100 appear from the output 1 and the output 2.

By combining images in a synthesizing circuit outside the device (off-chip) by using the two outputs, i.e., output 1 and output 2 having different accumulation periods, a signal output which is not easily saturated for a large light quantity can be obtained, thereby increasing the dynamic range.

However, the dynamic range cannot be increased unless a sensor structure having an inter-pixel memory is used. That is, the type of sensor device is restricted.

In the mechanism of the related art, although the type of sensor device is not restricted since a sensor structure having an inter-pixel memory is not required, readout circuits are required across the imaging area, thereby increasing the circuit scale. Additionally, since the long-period accumulation signal and the short-period accumulation signal are output at different times, the two signals have to be synchronized with each other by a memory having a capacity for Δ rows when they are combined. Further, since two frames having different accumulation periods are combined by the off-chip method, the system scale is disadvantageously increased.

SUMMARY OF THE INVENTION

In view of the above-described circumstances, it is an object of the present invention to provide a mechanism for increasing the dynamic range with simple digital processing without restricting the type of sensor device.

An image processing method of the present invention is an image processing method for obtaining digital data representing a result of addition computation for a plurality of image signals to be processed. In this method, by using digital data for a first image signal of the plurality of image signals obtained under a condition of different accumulation periods as an initial value for a counting operation, an electric signal corresponding to a second image signal of the plurality of image signals is compared with a reference signal for obtaining digital data for the second image signal. The counting operation is performed in a mode having the same sign as the sign of digital data for the first image signal between a down-counting mode and an up-counting modem while the comparison processing is being performed, and a count value when the comparison processing is finished is stored. The stored count value is then output at a predetermined timing as computed data.

The digital data for the image signal among the plurality of image signals used as the initial value may be obtained by performing the comparison processing and the counting operation.

In any of the arrangement, after performing AD conversion by the counting operation for the second image signal in the mode having the same sign as the digital data for the first image signal, the digital data representing an addition computation result between the plurality of signals can be automatically obtained as the count value. Since the image signals have been obtained under the condition of different accumulation periods, a digital image signal having a wide dynamic range can be obtained as the counting result.

When performing the counting operation in the down-counting mode or the up-counting mode, a common up/down counter may be used for switching the processing mode. With the use of the common counter, the size of the counter circuit used for the counting operation can be reduced. Additionally, by performing the counting operation by switching the two modes, the addition computation for increasing the dynamic range can be performed directly without the need for a special adder for computing the sum.

The count value indicating the computation operation result obtained in the previous counting operation may be stored in a predetermined data storage unit. The current counting operation can be performed while reading out the count value stored in the data storage unit. With this arrangement, pipeline processing for simultaneously performing addition computation by using the counting operation and reading out the counting result can be implemented.

By considering the luminosity, the amount by which the reference signal used for comparison processing is changed over time may be adjusted so that the coefficient for image signals subjected to addition processing is set. Particularly, it is preferable that the amount by which the reference signal is changed over time is adjusted for images obtained under a comparatively short accumulation period. Then, the luminosity can be adjusted without causing saturation of high level signals that would be saturated under the condition of a normal accumulation period.

In a semiconductor device for detecting a physical quantity distribution in which unit elements are disposed in a predetermined order, such as a matrix, each of the unit element including a charge generator for generating charge corresponding to applied electromagnetic waves and a unit signal generator for generating a unit signal in accordance with the charge generated by the charge generator, the above-described processing can be used as the processing for converting the analog unit signal generated and output by the unit signal generator into digital data.

If the unit elements are disposed in a two-dimensional matrix, scanning (vertical scanning) may be performed in units of rows (in a column parallel) for accessing and reading the analog unit image signals (pixel signals) generated by the unit signal generators and output in the column direction. In this case, the comparison processing and the counting operation may be performed for each of the unit elements of each row, thereby implementing the fast addition computation for the AD conversion and the fast reading of the addition computation result.

A semiconductor device or an electronic apparatus of the present invention is suitable for performing the image processing method of the present invention. The semiconductor device or the electronic apparatus includes a comparator for comparing each of a plurality of analog image signals to be processed with a reference signal for converting the analog image signals into digital data, and a counter for performing, by using digital data for a first image signal of a plurality of analog image signals obtained under a condition of different accumulation periods, which indicate a time for generating the charge in the charge generator, as an initial value for a counting operation, a counting operation in a mode having the same sign as the sign of the digital data for the first image signal between a down-counting mode and an up-counting mode while the comparison processing by the comparator is being performed, and for storing a count value when the comparison processing performed by the comparator is finished.

Preferably, the semiconductor device or the electronic apparatus may include an accumulation period controller for controlling accumulation periods, a reference signal generator for generating a reference signal for converting each analog signal into digital data and supplying the digital data to the comparator, and a controller for controlling the mode of the counting operation in the counter.

The accumulation period controller may control the accumulation periods in the charge generators located at the same position so as to sequentially output the plurality of analog image signals obtained under the condition of different accumulation periods from the charge generators located at the same position. The comparator and the counter may perform corresponding processing for the plurality of analog image signals whose accumulation periods are controlled and which are sequentially output from the charge generators located at the same position.

If the unit elements are disposed in a matrix, and if a set of the comparator and the counter is disposed for the unit elements in each column, an accumulation period controller may control the accumulation periods in units of rows, and the comparator and the counter may perform corresponding processing for the plurality of image signals in the same column whose accumulation periods are controlled in units of rows.

The counter may be formed of a common counter circuit that can switch between the up-counting mode and the down-counting mode. Alternatively, the counter may be formed of a down counter circuit for performing the counting operation in the down-counting mode and an up counter circuit for performing the counting operation in the up-counting mode. The second type of counter may include an addition circuit for computing the sum of the count value stored in the down counter circuit and the count value stored in the up counter circuit.

DESCRIPTION OF THE PREFERRED EMBODIMENTS

Embodiments of the present invention are described in detail below with reference to the drawings. In the following description, CMOS imaging devices, which are one type of X-Y address solid-state imaging devices, are used. It should be assumed that all the CMOS imaging devices are NMOS or PMOS.

However, the use of CMOS imaging devices is an example only, and devices used in the present invention are not restricted to MOS imaging devices. The following embodiments can be similarly applied to all semiconductor devices for detecting the physical quantity distribution, in which a plurality of unit elements responsive to electromagnetic waves, such as light or radiation, input from an externally source, are disposed in a line or matrix.

First Embodiment; Configuration of Solid-State Imaging Apparatus

Figure 1:
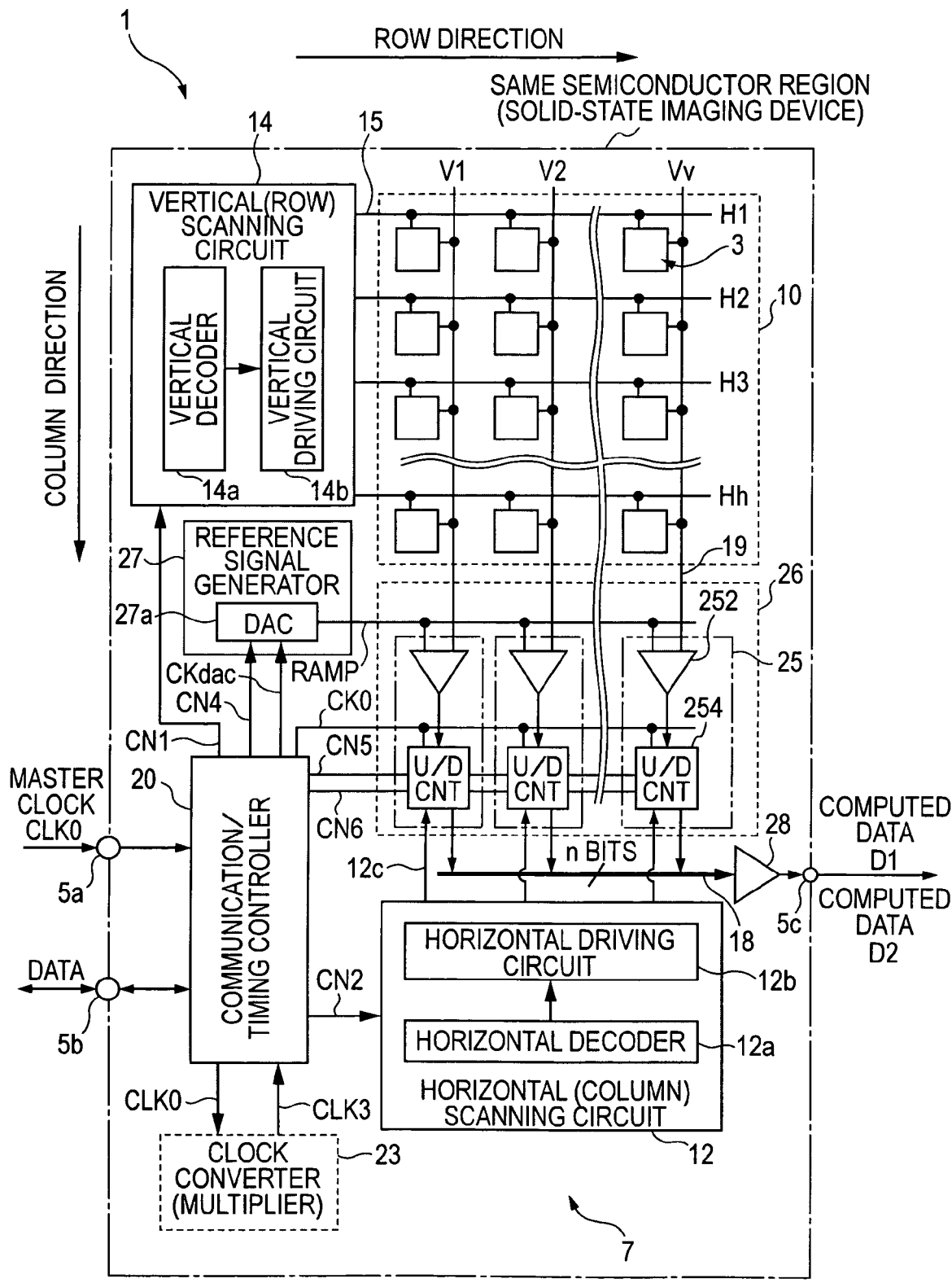
FIG. 1 is a schematic diagram illustrating a CMOS solid-state imaging apparatus, which is a first embodiment of a semiconductor device of the present invention.

FIG. 1 is a schematic diagram illustrating a CMOS solid-state imaging apparatus (CMOS image sensor), which is a first embodiment of the semiconductor device of the present invention. The CMOS solid-state imaging apparatus is also one aspect of an electronic apparatus according to the present invention.

A solid-state imaging apparatus 1 includes a pixel portion in which a plurality of pixels including photoelectric conversion devices (one example of a charge generator), such as photodiodes, for outputting an electric signal in accordance with the quantity of incident light are disposed in rows and columns (i.e., in a two-dimensional matrix), a signal output from each pixel being a voltage signal. Image processors, such as CDS (Correlated Double Sampling) processing functions and digital converters (ADC; Analog Digital Converters), are disposed in the individual columns in parallel with each other.

"Image processors are disposed in the individual columns in parallel with each other" means that a plurality of CDS processing functions and digital converters are provided for vertical signal lines 19 in vertical columns substantially in parallel with each other. When the device is viewed from the top, those functional components may be disposed only at one edge (the output side at the bottom in FIG. 1), or may be disposed at one edge (the output side at the bottom in FIG. 1) and the other edge (at the top in FIG. 1) across the pixel portion 10. In the second case, it is preferable that horizontal scanners for conducting readout scanning in the row direction (horizontal scanning) are disposed at the two edges and are independently operated.

A typical example in which CDS processing functions and digital converters are provided vertically in parallel with each other is a column-type imaging sensor. In this type of imaging sensor, CDS processing functions and digital converters are disposed vertically in parallel with each other in a column area disposed at the output side of the imaging portion, and signals are sequentially read out to the output side. Alternatively, the imaging portion having another form may be used. For example, one CDS processing function and one digital converter may be assigned to a plurality of (for example, two) adjacent vertical signal lines 19, or one CDS processing function and one digital converter may be assigned to N vertical signal lines 19 (vertical columns) in N other lines (N is a positive integer).

In any of the forms other than the column type, since one CDS processing function and one digital converter are used for a plurality of vertical signal lines 19 (vertical columns), a switch circuit (switch) is provided for supplying pixel signals for a plurality of columns of signal lines 19 from a pixel portion 10 to one CDS processing function or one digital converter. A memory for storing output signals may be required depending on the processing of the subsequent stage.

By assigning one CDS processing function and one digital converter to a plurality of vertical signal lines 19 (vertical columns), signal processing can be performed on pixel signals after being read from the pixel columns. Accordingly, compared to when similar image processing is performed on a pixel signal in each unit pixel, the configuration of each unit pixel can be simplified, and a multi-pixel, smaller, and less expensive image sensor can be implemented.

Additionally, a plurality of signal processors disposed vertically in parallel with each other can simultaneously process one row of pixel signals. Accordingly, compared to when processing is performed by one CDS processing function and one digital converter in an output circuit or outside the device, the signal processors can be operated at a lower speed, which is more advantageous in terms of the power consumption, the band performance, and noise. In other words, when the power consumption and the band performance are the same, a higher operation in the overall sensor can be implemented.

The column-type imaging sensor, which can operate at a lower speed, is advantageous in terms of the power consumption, the band performance, or noise, and is also advantageous in that a switch circuit (switch) is not required. In the following embodiments, it should be assumed that the column-type imaging sensor is used unless otherwise stated.

The solid-state imaging apparatus 1 of the first embodiment includes, as shown in FIG. 1, the pixel portion (imaging portion) 10 in which a plurality of square unit pixels 3 are disposed in rows and columns (i.e., in a square lattice), a driving controller 7, a column processor 26, a reference signal generator 27 for supplying an AD-conversion reference signal to the column processor 26, and an output circuit 28 which are disposed outside the pixel portion 10.

If necessary, before or after the column processor 26, an AGC (Auto Gain Control) circuit having a signal amplifying function may be disposed in the same semiconductor region in which the column processor 26 is disposed. If AGC is performed before the column processor 26, analog amplification is conducted, and if AGC is performed after the column processor 26, digital amplification is conducted. If n-bit digital data is directly amplified, the grayscale may be impaired. It is thus preferable that analog amplification is conducted on a signal before performing digital conversion.

The driving controller 7 is provided with control circuit functions of sequentially reading signals from the pixel portion 10. For example, the driving controller 7 includes the horizontal scanning circuit (column scanning circuit) 12 for controlling column addressing or column scanning, a vertical scanning circuit 14 (row scanning circuit) for controlling row addressing and row scanning, and a communication/timing controller 20 having a function of, for example, generating an internal clock.

As indicated by the broken lines in the vicinity of the communication/timing controller 20, as an example of a high-speed clock generator, a clock converter 23 for generating pulses having a clock frequency higher than an input clock frequency may be disposed. The communication/timing controller 20 generates the internal clock based on an input clock (master clock) CLK0 input via a terminal 5a and a high-speed clock generated in the clock converter 23.

By using a signal based on the high-speed clock generated in the clock converter 23, AD conversion processing can be operated at a high speed. By using the high-speed clock, motion extraction or compression processing requiring fast calculations can be performed. Additionally, parallel data output from the column processor 26 can be converted into serial data so that video data D1 is output to the outside the apparatus 1. With this configuration, the fast operation can be implemented with the number of terminals smaller than the number of bits of AD-converted digital data.

The clock converter 23 has a built-in multiplier circuit for generating pulses having a clock frequency higher than the input clock frequency. This clock converter 23 receives a low-speed clock CLK2 from the communication/timing controller 20, and generates a clock having a frequency at least twice as high as the low-speed clock CLK2 based on the low-speed clock CLK2. As the multiplier circuit of the clock converter 23, a k1 multiplier circuit can be provided when k1 is the factor of the frequency of the low-speed clock CLK2, and various known circuits can be used.

Although some of the rows and columns are not shown in FIG. 1 for simple representation, in actuality, several tens of to several thousands pixel units 3 are disposed in each row or each column. Typically, the pixel unit 3 is formed of a photodiode as a light-receiving device (charge generator) and an inter-pixel amplifier having an amplifying semiconductor device (for example, a transistor).

As the inter-pixel amplifier, for example, a floating diffusion amplifier can be used. For example, for the charge generator, a 4TR structure having four transistors, which are generally used in a CMOS sensor, such as a readout selection transistor, which is an example of a charge reader (transfer gate/readout gate), a reset transistor, which is an example of a reset gate, a vertical selecting transistor, and a source-follower amplifying transistor, which is an example of a detector device for detecting a change in the potential of the floating diffusion, can be used.

Alternatively, as disclosed in Patent Number 2708455, an inter-pixel amplifier having a 3TR structure formed of three transistors, such as an amplifying transistor connected to a drain line (DRN) so as to amplify a signal voltage in accordance with signal charge generated by the charge generator, a reset transistor for resetting the charge generator, and a readout selection transistor (transfer gate) which is scanned by a vertical shift register via a transfer line (TRF), may be used.

As the other elements forming the driving controller 7, the horizontal scanning circuit 12, the vertical scanning circuit 14, and the communication/timing controller 20 are disposed. The horizontal scanning circuit 12 has a readout scanning function of reading count values from the column processor 26. Those elements forming the driving controller 7 are integrally formed, with the pixel portion 10, on a semiconductor region, such as a monocrystal silicon, by using a technique similar to a semiconductor integrated circuit manufacturing technique, thereby forming a solid-state imaging device (imaging apparatus), which is an example of a semiconductor system.

The pixel units 3 are connected to the vertical scanning circuit 14 via row control lines 15 for selecting rows and are also connected via the vertical signal lines 19 to the column processor 26 in which a column AD circuit 25 is provided for each vertical column. The row control lines 15 represent the overall wiring from the vertical scanning circuit 14 to the pixels.

In this embodiment, the column AD circuit 25 has an image processing function of obtaining digital data by itself, which is a product-sum operation result of a plurality of signals.

Each of the horizontal scanning circuit 12 and the vertical scanning circuit 14 has a decoder, which is described below, and starts reading pixel signals to be processed in response to control signals CN1 and CN2 supplied from the communication/timing controller 20. Accordingly, various pulse signals (for example, a reset pulse RST, a transfer pulse TRF, and a DRN control pulse DRN) for driving the unit pixels 3 are contained in the row control lines 15.

In this embodiment, the vertical scanning circuit 14 and the communication/timing controller 20 form a unit-signal selecting controller that specifies the positions of a plurality of unit pixels 3 subjected to product-sum operation processing to input a plurality of pixel signals into the column processor 26 from the specified unit pixels 3.

Although it is not shown, the communication/timing controller 20 has a functional block of a timing generator TG (an example of a readout address control device) for supplying clocks required for the operations of the individual elements and predetermined-timing pulse signals and a functional block of a communication interface for receiving the master clock CKL0 via the terminal 5a and receiving data DATA indicating the operation mode via a terminal 5b and also for outputting data containing information concerning the solid-state imaging apparatus 1.

For example, the communication/timing controller 20 outputs a horizontal address signal to a horizontal decoder 12a and a vertical address signal to a vertical decoder 14a, and each decoder 12a or 14a receives the corresponding address signal to select the corresponding column or row.

In this case, since the pixel units 3 are disposed in a two-dimensional matrix, fast reading of the pixel signals and pixel data is preferably performed in the following manner. Vertical scanning is performed such that analog pixel signals generated by pixel signal generators 5 and output in the column direction via the vertical signal lines 19 are accessed and read in units of rows, and then, horizontal scanning is performed such that pixel signals (in this embodiment, digital pixel data) are accessed in the row direction and are read out to the output side. The reading of the pixel signals and pixel data is not restricted to scanning, and random access may be performed by directly addressing the unit pixels 3 to be read out and by reading information only concerning the required unit pixels 3.

The communication/timing controller 20 in the first embodiment supplies a clock CLK1 having the same frequency as the master clock CLK0 input via the terminal 5a and a low-speed clock which is scaled down to a half of the clock CLK1 or lower to the elements, such as the horizontal scanning circuit 12, the vertical scanning circuit 14, and the column processor 26. The clocks scaled down to a half of the master clock or lower are hereinafter referred to as the "low-speed clock CLK2".

The vertical scanning circuit 14 selects rows of the pixel portion 10 and supplies required pulses to the selected rows. For example, the vertical scanning circuit 14 includes the vertical decoder 14a for defining rows of the pixel portion 10 to be read and a vertical driving circuit 14b for driving the read rows by supplying pulses to the row control lines 15 corresponding to the unit pixels 3 at the readout addresses (rows) defined by the vertical decoder 14a. The vertical decoder 14a selects, not only rows from which signals are read out, but also a row used for an electronic shutter. That is, the vertical scanning circuit 14 serves as a controller for the accumulation period, which is the time for generating charge in the charge generator provided for the unit pixel 3.

The horizontal scanning circuit 12 sequentially selects the column AD circuits 25 of the column processor 26 in synchronization with the low-speed clock CLK2, and outputs the corresponding signals to a horizontal signal line (horizontal output line) 18. The horizontal scanning circuit 12 includes the horizontal decoder 12a for defining columns to be read (column AD circuits 25 within the column processor 26) and a horizontal driving circuit 12b for outputting the signals of the column processor 26 to the horizontal signal line 18 according to the readout addresses defined by the horizontal decoder 12a. If the number of bits handled by the column AD circuits 25 is n (n is a positive integer), for example, 10 (=n) bits, the horizontal signal line 18 includes 10 lines.

In the solid-state imaging apparatus 1 configured as described above, the pixel signals output from the unit pixels 3 of each vertical column are supplied via the vertical signal line 19 to the corresponding column AD circuits 25 of the column processor 26.

On the signal path between the column processor 26 and the horizontal scanning circuit 12, a load transistor portion containing load MOS transistors (not shown) whose drain terminals are connected to the corresponding vertical signal lines 19 is disposed, and a load controller (load MOS controller) for controlling the driving of the load MOS transistors is provided.

The amplifying transistor forming the pixel unit 3 is connected to the corresponding vertical signal line 19, and the vertical signal line 19 is connected to the drain of the load MOS transistor in each vertical column, and a load control signal CTld from the load controller is input into the gate terminals of all the load MOS transistors. When the signals are read out, a predetermined constant current continues to flow by the load MOS transistors connected to the corresponding amplifying transistors.

Each column AD circuit 25 of the column processor 26 receives pixel signals for one row and converts them into digital data. The column AD circuit 25 also sequentially receives a plurality of pixel signals to be subjected to a product-sum operation (which are not necessarily in the same vertical column) at the pixel positions designated by the unit-signal selecting controller, which functions by the operations of the communication/timing generator 20 and the vertical scanning circuit 14, and performs a product-sum operation based on the plurality of pixel signals. The column AD circuit 25 also converts the resulting value into digital data. Each column AD circuit 25 has, for example, an ADC (Analog Digital Converter) circuit having an operation function for performing a product-sum operation and for converting an analog signal into, for example, 10-bit digital data, based on the low-speed clock CLK2.

Details of the configuration of the ADC circuit are given below. AD conversion is performed as follows. A ramp reference signal (reference voltage) RAMP is supplied to a comparator (voltage comparator), and at the same time, counting with a clock signal is started. Counting is continued until a pulse signal is obtained by comparing an analog pixel signal input via the vertical signal line 19 with the reference signal RAMP.

In this case, by modifying the circuit configuration, in addition to AD conversion, for a voltage-mode pixel signal input via the vertical signal line 19, the difference between the signal level (noise level) immediately after resetting the pixels and the true signal level Vsig based on the quantity of the received light can be taken. With this arrangement, noise signal components, such as fixed pattern noise (FPN) or reset noise, can be eliminated.

The pixel data digitized in the column AD circuit 25 is transferred to the horizontal signal line 18 via a horizontal select switch (not shown) driven by a horizontal selection signal supplied from the horizontal scanning circuit 12, and is output to the output circuit 28. The 10-bit digital data is an example only, and the number of bits may be smaller than 10 (for example, 8 bits) or larger than 10 (for example, 14 bits).

With the above-described configuration, from the pixel portion 10 in which light-receiving devices as the charge generators are disposed in rows and columns, pixel signals are sequentially output from the individual columns. Then, one image corresponding to the pixel portion 10 in which light-receiving devices (photoelectric conversion devices, such as photodiodes) are disposed in rows and columns, i.e., a frame image, is represented by a set of pixel signals of the overall pixel portion 10.

Details of Column AD Circuit and Reference Signal Generator

The reference signal generator 27 includes a DA conversion circuit (DAC; Digital Analog Converter) 27a. The DA conversion circuit 27a generates a stepped-ramp saw tooth wave (ramp waveform) from the initial value represented by control data CN4 supplied from the communication/timing controller 20 in synchronization with a count clock CKdac from the communication/timing controller 20, and supplies the generated saw tooth wave to the individual column AD circuits 25 of the column processor 26 as the AD conversion reference signal (ADC reference signal) RAMP. A noise-suppressing filter may be disposed, though it is not shown in FIG. 1.

A stepped-ramp saw tooth wave generated based on a high-speed clock supplied from a clock converter 23, for example, a multiplied clock generated in a multiplier circuit, can be changed at a higher speed than when the saw tooth wave is generated based on the master clock CLK0 input via the terminal 5a.

The control data CN4 supplied from the communication/timing controller 20 to the DA conversion circuit 27a of the reference signal generator 27 contains information indicating the gradient (the degree by which the voltage is changed; the amount by which the voltage is changed with respect to the time) of the ramp voltage for each comparison processing. More specifically, the amount by which the voltage is changed for each counting operation is set, and the count value is changed per unit time (count clock CKdac).

For example, the DA conversion circuit 27a reduces the voltage (for example, 3.0 V) indicating the initial value contained in the control data CN4 by ΔRAMP for each count clock CKdac. By adjusting the cycle of the count clock CKdac, the gradient of the voltage can be changed. For example, if a clock scaled down to 1/m with respect to the reference clock is used, the gradient becomes 1/m. If the count clock CK0 used in counters 254 is the same, the count value becomes as large as m times for the same pixel voltage. That is, m can be set as the coefficient. By changing the gradient of the reference signal RAMP, the coefficient of the product-sum operation, which is described below, can be adjusted.

Alternatively, another type of circuit may be used. For example, when the output value of the counter 254 is x and when the gradient (rate of change) of the ramp voltage contained in the control data CN4 is β while the cycle of the count clock CKdac supplied to the reference signal generator 27 is fixed, the potential calculated by y=α (initial value)−β*x is output. In this manner, according to the information indicating the gradient (rate of change) of the ramp voltage contained in the control data CN4, a change in the voltage ΔRAMP (=β) for each count clock CKdac can be adjusted.

For the signal difference processing to determine the difference between the reference signal level and the true signal component level of the same pixel signal to be processed, it is preferable that the levels of the absolute values of the gradients (rate of change) of the ramp voltages used for comparison processing be set to be the same.

If the spatial difference processing or the temporal difference processing for the signal difference processing is performed on a plurality of image signals (in this embodiment, pixel signals) to be processed, the levels of the absolute values of the gradients (rates of change) of the ramp voltages for the image signals may be set to be the same or may be set to be different.

By setting the levels of the absolute values of the gradient (rate of change) to be different, the function of finding the sum (with a sign) of the pixel signals (more specifically, true signal components) supplied from the unit pixels 3 after being multiplied with the coefficient, i.e., the product-sum operation, can be implemented. In this case, if the spatial difference processing or the temporal difference processing is performed on three or more pixel signals, the number of pixels to be compared with the ramp voltage having the same absolute value of the gradient (rate of change) and the number of pixels to be compared with the ramp voltage having different absolute values of the gradients may be selected in a desired manner.

The column AD circuit 25 includes the voltage comparator 252 for comparing the reference signal RAMP generated in the DA conversion circuit 27a of the reference signal generator 27 with an analog pixel signal supplied from the unit pixels 3 of the row control lines 15 (H0, H1, . . . ) via the vertical signal line 19 (V0, V1, . . . ). The column AD circuit 25 also includes the counter 254 for counting the time until the voltage comparator 252 finishes the comparison processing and for storing the counting result. That is, the column AD circuit 25 has an n-bit AD conversion function.

The communication/timing controller 20 has a function of controlling the count mode to be used in the counter 254 according to whether the reset component ΔV or the signal component Vsig of the pixel signal is used for comparison processing in the voltage comparator 252. A mode control signal CN5 for designating whether the counter 254 is operated in a down-counting mode or an up-counting mode and a reset control signal CN6 for resetting the count value stored in the counter 254 to the initial value are input from the communication/timing generator 20 into the counter 254 of each column AD circuit 25.

The stepped-ramp reference signal RAMP generated in the reference signal generator 27 is input into one input terminal RAMP of each of the voltage comparators 252, and the other input terminals of the voltage comparators 252 are connected to the corresponding vertical signal lines 19 and receive the pixel signal voltages from the pixel portion 10. The output signals from the voltage comparators 252 are supplied to the corresponding counters 254.

The count clock CK0 is input from the communication/timing controller 20 to the clock terminals CK of the counters 254.

Although the configuration of the counter 254 is not shown, the counter 254 can be implemented by changing the wiring arrangement of a data storage unit 255 formed of latches into a synchronous counter, and the internal counting is performed by receiving one count clock CK0. As in the stepped voltage waveform, the count clock CK0 can also be generated based on a high-speed clock (for example, a multiplied clock) from the clock converter 23 so that it is operated faster than the master clock CLK0 input via the terminal 5a.

The n-bit counter 254 can be implemented by a combination of n latches, and the circuit scale can be reduced to one half of the circuit scale of the data storage unit 255 formed of two blocks, each having n latches. Additionally, the provision of a counter 24 is not necessary, and the overall configuration relatively becomes small.

Although details of the configuration of the counters 254 of the first embodiment are given below, the main feature of the counters 254 is as follows. By the use of the common up/down counter (U/D CNT) regardless of the count mode, counting can be performed on the same pixel signal or a plurality of pixel signals having the same physical properties by switching between the down-counting operation and the up-counting operation.

The counters 254 are configured so that they can detect the overflow of counting or process the positive and negative signs (+/−). For example, by using known art, for example, by adding an overflow surplus bit or using a carry bit or a borrow bit, the overflow or sign processing can be easily handled.

A pixel signal output from the unit pixel 3 contains, not only true, effective signal components, but also reset components. Time-sequentially, the reset components (reference components) first appear, followed by the true, effective signal components superposed on the reset components. The difference between the reset components and the true, effective signal components superposed on the reset components is the true, effective signal components.

Accordingly, to obtain digital data of the true, effective signal components Vsig for a pixel signal, when conducting AD conversion on the same pixel signal Vx by performing counting on the reference components (reset components ΔV) and the true signal components, digital data obtained for one of the reference components and the true signal components (generally, the reset components) is used as the initial value for the counting operation on the other components (generally, the signal components).

With this arrangement, after conducting AD conversion by the counting operation on the other components, digital data, which is the difference between the two components, can be automatically obtained. That is, the difference between the reference components and the signal components of an analog image signal can be converted into digital data.

The counting operation is repeatedly performed on a plurality of different pixel signals (for example, pixel signals having different pixel positions or pixel signals which are the same in the pixel position and are different in the imaging time) having the same physical properties by the same combination of the count modes, thereby implementing the addition operation for a plurality of pixel signals. Also, the counting operation is repeatedly performed on the plurality of different pixel signals by changing the combination of the count modes (more specifically, by reversing the combination), thereby implementing the difference (subtraction) operation for a plurality of pixel signals. The switching of the operation processing modes can be implemented by adjusting the scanning patterns of the horizontal scanning circuit 12 and the vertical scanning circuit 14 under the control of the communication/timing controller 20.

For example, in the counter 254, when conducting AD conversion by performing the counting operation for each of the pixel signals of the plurality of unit pixels 3, digital data obtained for one of the pixel signals is used as the initial value for the counting operation for the other pixel signal (the signal to be subjected to the second counting operation). As a result, after conducting AD conversion by performing the counting operation for the other pixel signal, digital data as a result of performing the product-sum operation for the two pixel signals can be automatically obtained.

In this case, by the use of the same count modes, the resulting count value obtained by the second counting operation is digital data as a result of adding the pixel signals (more specifically, the true signal components) of the plurality of unit pixels 3. In contrast, by the use of different count modes (opposite modes), the count value obtained by the second counting operation is digital data as a result of performing subtraction on the pixel signals of the plurality of pixel signals 3. If three or more pixels are processed, the above-described operations may be combined, in which case, the function of finding the sum with a sign for the pixel signals (more specifically, the true signal components) from the unit pixels 3, i.e., the product-sum operation, can be implemented.

As the counter 254 of the first embodiment, a synchronous counter for outputting count output values in synchronization with the count clock CK0 is used. In the case of the synchronous counter, the operations of all the flip-flops (counter basic elements) are restricted by the count clock CK0. Thus, if a higher frequency operation is required, the use of an asynchronous counter suitable for the fast operation is preferable since the operation limit frequency is determined only by the limit frequency of the first flip-flop (counter basic element).

A control pulse is input from the horizontal scanning circuit 12 into the counter 254 via a control signal 12c. The counter 254 has a latch function of latching a counting result, and latches the counter output value until the control pulse is received via the control line 12c.

The column AD circuit 25 configured as described above is disposed for each vertical signal line 19 (V0, V1, ...) to form the column processor 26, which is a column-parallel structured ADC block.

The output sides of the column AD circuits 25 are connected to the horizontal signal line 18. As described above, the horizontal signal line 18 includes the same n number of signal lines as the n-bit column AD circuit 25, and the signal lines are connected to the output circuit 28 via n sensing circuits (not shown) corresponding to output lines.

With this configuration, during the pixel signal readout period, the column AD circuit 25 performs a counting operation and outputs the counting result at a predetermined timing. More specifically, the voltage comparator 252 first compares the ramp waveform voltage from the reference signal generator 27 with the pixel signal voltage input via the vertical signal line 19, and when the two voltages become equal to each other, the comparator output of the voltage comparator 252 is inverted (in this embodiment, from the H level to the L level).

The counter 254 has already started the counting operation in the down-counting mode or the up-counting mode in synchronization with the ramp waveform voltage input from the reference signal generator 27, and when receiving information indicating that the comparator output is inverted, the counter 254 stops the counting operation and latches (stores) the count value as pixel data, thereby completing AD conversion.

Thereafter, the counter 254 sequentially outputs the stored pixel data to the outside the column processor 26 or the outside the chip having the pixel portion 10 via an output terminal 5c based on the shift operation of horizontal selecting signals CH(i) input from the horizontal scanning circuit 12 via the control line 12c at a predetermined timing.

Other various signal processing circuits may be contained in the elements forming the solid-state imaging apparatus 1, though they are not shown since they are not directly related to this embodiment.

First Embodiment; Signal Difference Processing Operation

Figure 2:
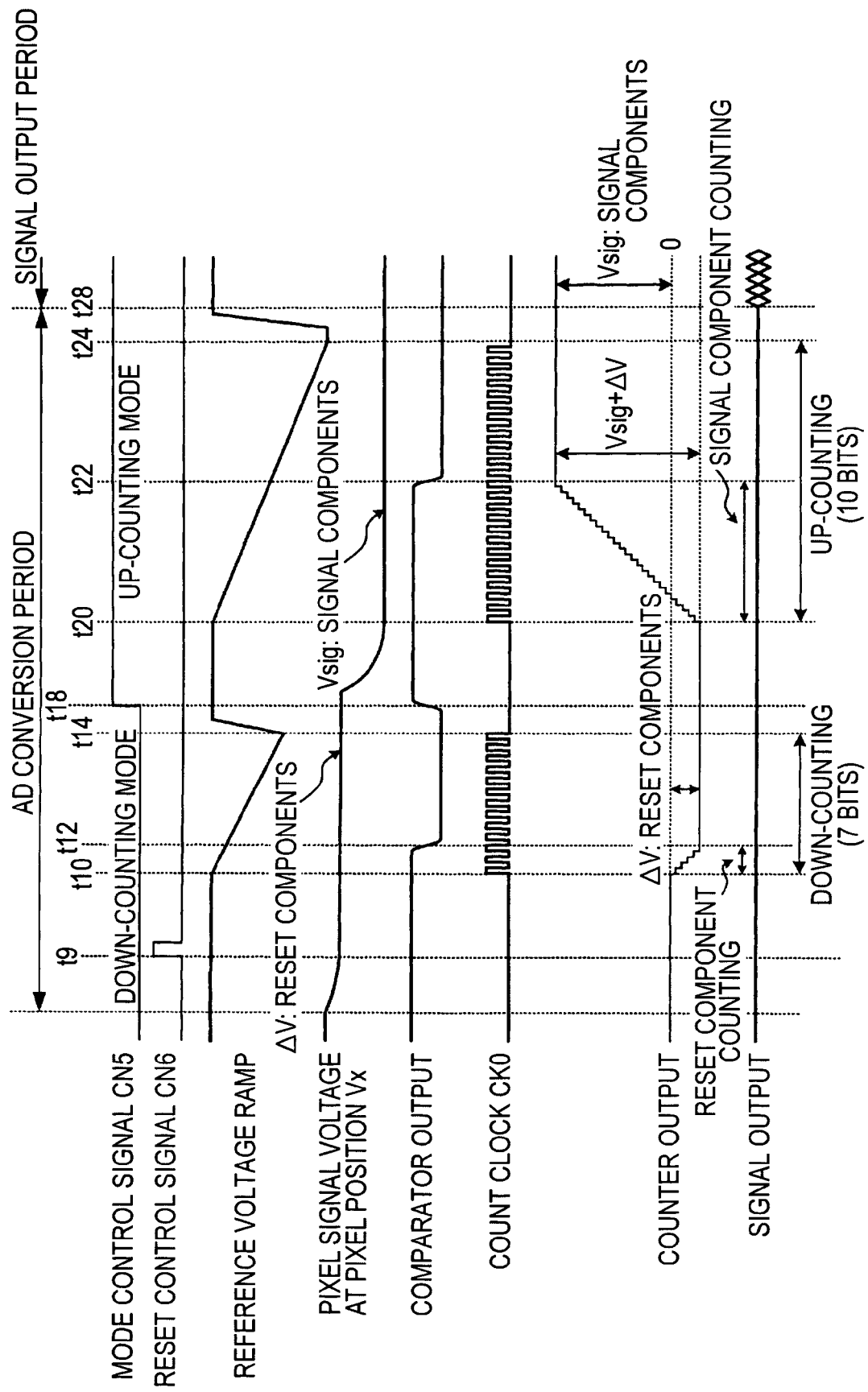
FIG. 2 is a timing chart illustrating the signal difference processing in column AD circuits of the solid-state imaging apparatus of the first embodiment shown in FIG. 1.

FIG. 2 is a timing chart illustrating the signal difference processing, which is the basic operation, in the column AD circuit 25 of the solid-state imaging apparatus 1 of the first embodiment shown in FIG. 1.

The mechanism for converting an analog pixel signal sensed in each pixel unit 3 of the pixel portion 10 into a digital signal is, for example, as follows. The time when the ramp waveform reference signal RAMP which is progressively reduced with a predetermined gradient becomes equal to the voltage of the reference components or the signal components of the pixel signal of the unit pixel 3 is searched, and the time from when the reference signal RAMP used for comparison processing is generated until when the electric signal corresponding to the reference components or the signal components of the pixel signal coincides with the reference signal is counted by the count clock, thereby obtaining the count value associated with the level of the reference components or the signal components.

For the pixel signal output from the vertical signal line 19, time-sequentially, the signal components Vsig appear after the reset components $\Delta V$, i.e., the reference components, containing noise of the pixel signal. If the first operation is performed on the reference components (reset components $\Delta V$), the second operation is performed on the signal obtained by adding the signal components Vsig to the reference components (reset components $\Delta V$). This operation is specifically discussed below.

For the first readout operation, the communication/timing controller 20 sets the mode control signal CN5 to the low level so that the counter 254 is set to be in the down-counting mode, and also sets the reset control signal CN6 to be active (in this embodiment, the high level) for a predetermined period so that the count value of the counter 254 is reset to the initial value 0 (t9). After the first readout operation for reading the pixel signals from selected rows Hx to the vertical signal line 19 (V0, V1, . . . ) is stabilized, the communication/timing controller 20 supplies the control data CN4 for generating the reference signal RAMP to the reference signal generator 27.

Upon receiving the control data CN4, the reference signal generator 27 outputs the stepped waveform (RAMP waveform) which is changed in the shape of a saw tooth wave (RAMP) over time to one input terminal RAMP of the voltage comparator 252 as the comparison voltage. The voltage comparator 252 compares the RAMP waveform comparison voltage with the pixel signal voltage of the selected vertical signal line 19 (Vx) supplied from the pixel portion 10.

Simultaneously with the input of the reference signal RAMP into the input terminal RAMP of the voltage comparator 252, to measure the comparison time in the voltage comparator 252 by the counter 254, the count clock CK0 is input from the communication/timing controller 20 into the clock terminal of the counter 254 in synchronization with the ramp waveform voltage output from the reference signal generator 27 (t10), and down-counting is started from the initial value 0 as the first counting operation. That is, the counting operation is started in the negative direction.

The voltage comparator 252 compares the ramp reference signal RAMP supplied from the reference signal generator 27 with the pixel signal voltage Vx input via the vertical signal line 19, and when the two voltages become equal to each other, the voltage comparator 252 inverts the comparator output from the H level to the L level (t12). That is, upon comparing the voltage signal corresponding to the reset components Vrst with the reference signal RAMP, the voltage comparator 252 generates an active-low (L) pulse signal after the lapse of the time corresponding to the level of the reset components Vrst, and supplies the generated pulse signal to the counter 254.

Upon receiving this result, the counter 254 stops the counting operation almost at the same time as the inversion of the comparator output, and latches (retains/stores) the corresponding count value as the pixel data, thereby completing AD conversion (t12). That is, the counter 254 starts down-counting simultaneously with the generation of the ramp reference signal RAMP to be supplied to the voltage comparator 252, and continues counting with the clock CK0 until the active-low (L) pulse signal is received as a result of comparison processing, thereby obtaining the count value corresponding to the level of the reset components Vrst.

After the lapse of a predetermined down-counting period (t14), the communication/timing controller 20 stops supplying the control data CN4 to the voltage comparator 252 and supplying the count clock CK0 to the counter 254. Then, the voltage comparator 252 stops generating the ramp reference signal RAMP.

In this first readout operation, since the counting operation is performed by detecting the reset level Vrst of the pixel signal voltage Vx by the voltage comparator 252, the reset components $\Delta V$ of the unit pixels 3 are read.

The reset components $\Delta V$ contain offset noise which varies depending on the unit pixel 3. Generally, however, a variation in the reset components $\Delta V$ is small, and the reset level Vrst is generally common for all the pixels. Accordingly, the output value of the reset components $\Delta V$ of the pixel signal voltage Vx of the selected vertical signal line 19 is generally known.

Accordingly, in the first readout operation for the reset components $\Delta V$, by adjusting the RAMP voltage, the down-counting period (t10 to t14; comparison period) can be reduced. In this embodiment, comparison processing is performed for the reset components $\Delta V$ by setting the maximum period for the comparison processing to be a 7-bit count period (128 clocks).

Subsequently, in the second readout operation, in addition to the reset components $\Delta V$, the electric signal components Vsig for each unit pixel 3 in accordance with the quantity of incident light are read, and an operation similar to the first readout operation is performed. More specifically, the communication/timing controller 20 first changes the mode control signal CN5 to the high level so that the counter 254 is set to be the up-counting mode (t18). Then, after the second readout operation for reading the signal components Vsig from the unit pixels 3 of the selected rows Hx to the vertical signal line 19 (V0, V1, . . . ) is stabilized, the communication/timing controller 20 supplies the control data CN4 for generating the reference signal RAMP to the reference signal generator 27.

Upon receiving the control data CN4, the reference signal generator 27 outputs the stepped waveform (RAMP waveform) which changes in the shape of a saw tooth (RAMP shape) over time to one input terminal RAMP of the voltage comparator 252 as the comparison voltage (t20). The voltage comparator 252 compares the RAMP waveform comparison voltage with the pixel signal voltage of the selected vertical signal line 19 (Vx) supplied from the pixel portion 10.

Simultaneously with the input of the reference signal RAMP into the input terminal RAMP of the voltage comparator 252, to measure the comparison time in the voltage comparator 252 by the counter 254, the count clock CK0 is input from the communication/timing controller 20 to the clock terminal of the counter 254 in synchronization with the ramp waveform supplied from the reference signal generator 27 (t20), and, in contrast to the first counting operation, in the second counting operation, the counter 254 starts up-counting from the count value corresponding to the reset components $\Delta V$ of the unit pixels 3 obtained in the first readout operation. That is, the counting operation is started in the positive direction.

The voltage comparator 252 compares the pixel signal voltage Vx input via the vertical signal line 19 with the ramp reference signal RAMP supplied from the reference signal generator 27, and when the two voltages become equal to each other, the voltage comparator 252 inverts the comparator output from the H level to the L level (t22). That is, upon comparing the voltage signal corresponding to the signal components Vsig with the reference signal RAMP, the voltage comparator 252 generates the active-low (L) pulse signal after the lapse of the time corresponding to the level of the signal components Vsig, and supplies the generated pulse signal to the counter 254.

Upon receiving this result, the counter 254 stops the counting operation almost at the same time as the inversion of the comparator output, and latches (retains/stores) the corresponding count value as the pixel data, thereby completing AD conversion (t22). That is, simultaneously with the generation of the ramp reference signal RAMP to be supplied to the voltage comparator 252, the counter 254 starts up-counting, and continues counting with the clock CK0 until the active-low (L) pulse signal is received as a result of comparison processing, thereby obtaining the count value corresponding to the level of the signal components Vsig.

After the lapse of a predetermined up-counting period (t24), the communication/timing controller 20 stops supplying the control data CN4 to the voltage comparator 252 and supplying the count clock CK0 to the counter 254. Then, the voltage comparator 252 stops generating the ramp reference signal RAMP.

In the second readout operation, since the counting operation is performed by detecting the signal components Vsig of the pixel signal voltage Vx by the voltage comparator 252, the signal components Vsig of the unit pixels 3 are read.

In this embodiment, as the counting operation by the counter 254, down-counting is performed during the first readout operation, and then, up-counting is performed during the second readout operation. Accordingly, the subtraction expressed by Equation 1 is executed automatically in the counter 254, and the count value as a result of the subtraction is retained in the counter 254 as the n-bit digital value.

Equation 1:

(Count value in the second comparison period)−(count value in the first comparison period)  (1)

In this case, Equation 1 can be modified into Equation 2, and as a result, the count value retained in the counter 254 is the n-bit digital value corresponding to the signal components Vsig.

Equation 2:

(Count value in the second comparison period)−(count value in the first comparison period) =(signal components Vsig+reset components $\Delta V1$+offset components in the column AD circuit 25) −(reset components $\Delta V$+offset components in the column AD circuit 25) =(signal components Vsig)  (2)

That is, as stated above, according to the difference processing in the counter 254 by the two readout operations and two counting operations, such as down-counting during the first readout operation and up-counting during the second readout operation, the reset components $\Delta V$ containing noise which varies depending on the unit pixel 3 and the offset components depending on the column AD circuit 25 can be eliminated, and only the electric signal components Vsig in accordance with the quantity of incident light in each pixel unit 3 can be extracted with a simple configuration. In this case, reset noise can also be advantageously eliminated.

Accordingly, the column AD circuit 25 in this embodiment serves as, not only a digital converter for converting an analog pixel signal into digital pixel data, but also as a CDS (Correlated Double Sampling) processing function.

The pixel data represented by the count value obtained in Equation 2 is a positive signal voltage, thereby eliminating the need for the complementary operation. Thus, the compatibility with known systems is high.

The electric signal components Vsig are read during the second readout operation. Accordingly, since the level of the quantity of light is determined in a wide range, it is necessary that the ramp voltage to be supplied to the voltage comparator 252 be sharply changed by setting the up-counting period (t20 to t24; comparison period) to be long.

Accordingly, in this embodiment, the comparison processing is performed for the signal components Vsig by setting the maximum period for the comparison processing to be a 10-bit count period (1024 clocks). That is, the maximum period for the comparison processing for the reset components $\Delta V$ (reference components) is set to be shorter than the maximum period for the comparison processing for the signal components Vsig. Instead of setting the maximum period (i.e., the maximum value of the AD conversion period) for the comparison processing for the reset components $\Delta V$ (reference components) to be the same as that for the signal components Vsig, the maximum period for the comparison processing for the reset components $\Delta V$ (reference components) is set to be shorter than that for the signal components Vsig, thereby decreasing the total AD conversion period of the two operations.

In this case, the total processing time for the two operations is adjusted to be within one horizontal period (one horizontal processing period). This adjustment can be made by setting the number of bits assigned to the maximum range (dynamic range) of the signal and by setting the cycle of the count clock CK0 assigned to one bit. The reference signal RAMP from the reference signal generator 27 is set to cover the maximum range (dynamic range) of the signal.

If the gradient of the reference signal RAMP or the cycle of the count clock CK0 is fixed, the AD conversion period can be adjusted according to the number of bits. For example, if the number of bits is reduced by m, the AD conversion period can be set to be $1/(2^m;$ ^ is an exponent). If the cycle of the count clock CK0 is fixed and if the gradient of the reference signal RAMP is multiplied with 1/k, the coefficient (gain) of the signal can be increased by the factor of k.

If the AD conversion period is differentiated between the reference components and the signal components, the number of comparison bits is different for the first operation and the second operation. In this case, the control data CN4 is supplied from the communication/timing controller 20 to the reference signal generator 27, and based on this control data CN4, the ramp voltage is generated in the reference signal generator 27 so that the gradient of the ramp voltage, i.e., the rate of change, in the reference signal RAMP, becomes the same between the first operation and the second operation. It is easy to set the gradient of the ramp voltage to be the same for the first operation and the second operation since the ramp voltage is generated by digital control. Accordingly, the precision of the AD conversion for the first operation can be equal to that for the second operation, thereby making it possible to obtain a correct subtraction result expressed by Equation 1 by the up/down counter.

At a predetermined timing (t28) after the completion of the second counting operation, the communication/timing controller 20 instructs the horizontal scanning circuit 12 to read out the pixel data. In response to this instruction, the horizontal scanning circuit 12 sequentially shifts the horizontal selection signals CH(i) to be supplied to the counters 254 via the control lines 12c.

With this operation, the count values expressed by Equation 2 stored/retained in the counters 254, i.e., the pixel data represented by the n-bit digital data, are sequentially output to the outside the column processor 26 or the outside the chip having the pixel portion 10 from the output terminal 5c via the n horizontal signal lines 18. Subsequently, the operation is similarly repeated row by row, thereby obtaining the video data D1 representing a two-dimensional image.

As described above, for conducting AD conversion by performing the counting operation on the reference components (reset components) and the true signal components, the counting operation is performed on the same pixel signal by switching between the down-counting operation and the up-counting operation (and more specifically, in the opposite modes), and also, the digital data (count value) obtained for one of the reference components (reset components) and the true signal components (in the above-described example, the reference components) is used as the initial value for the counting operation for the other components (in the above-described example, the signal components). As a result, upon completing the AD conversion by the counting operation for the other components (in the above-described example, the signal components), the digital data, which is the difference between the two types of components, can be automatically obtained. That is, the difference signal components between the reference components and the signal components of the analog pixel signal can be converted into digital data.

Temporal Addition Processing Operation; First Example

Figure 3:
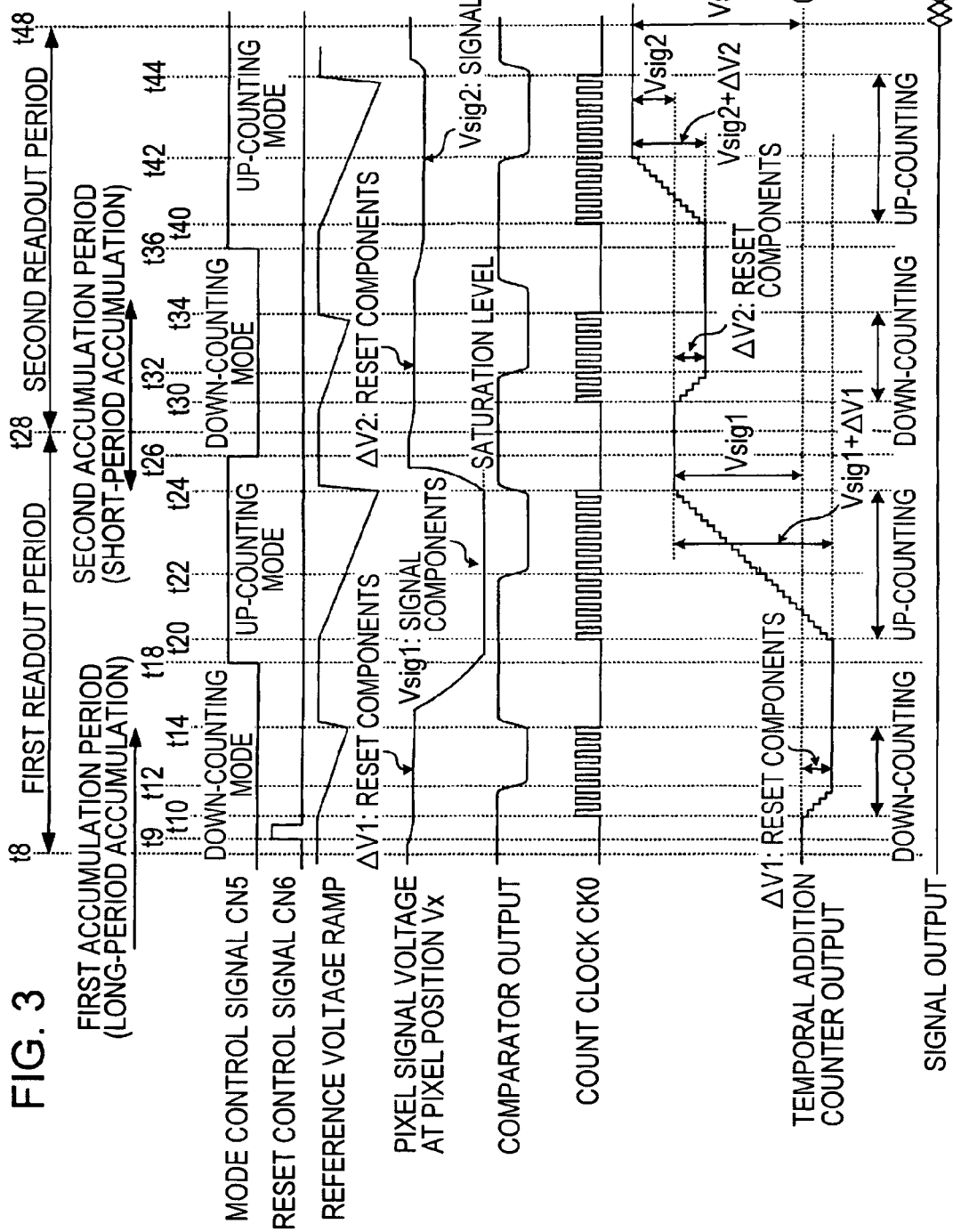
FIG. 3 is a timing chart illustrating a first example of the temporal addition processing operation in the column AD circuits of the solid-state imaging apparatus of the first embodiment shown in FIG. 1.
Figure 4:
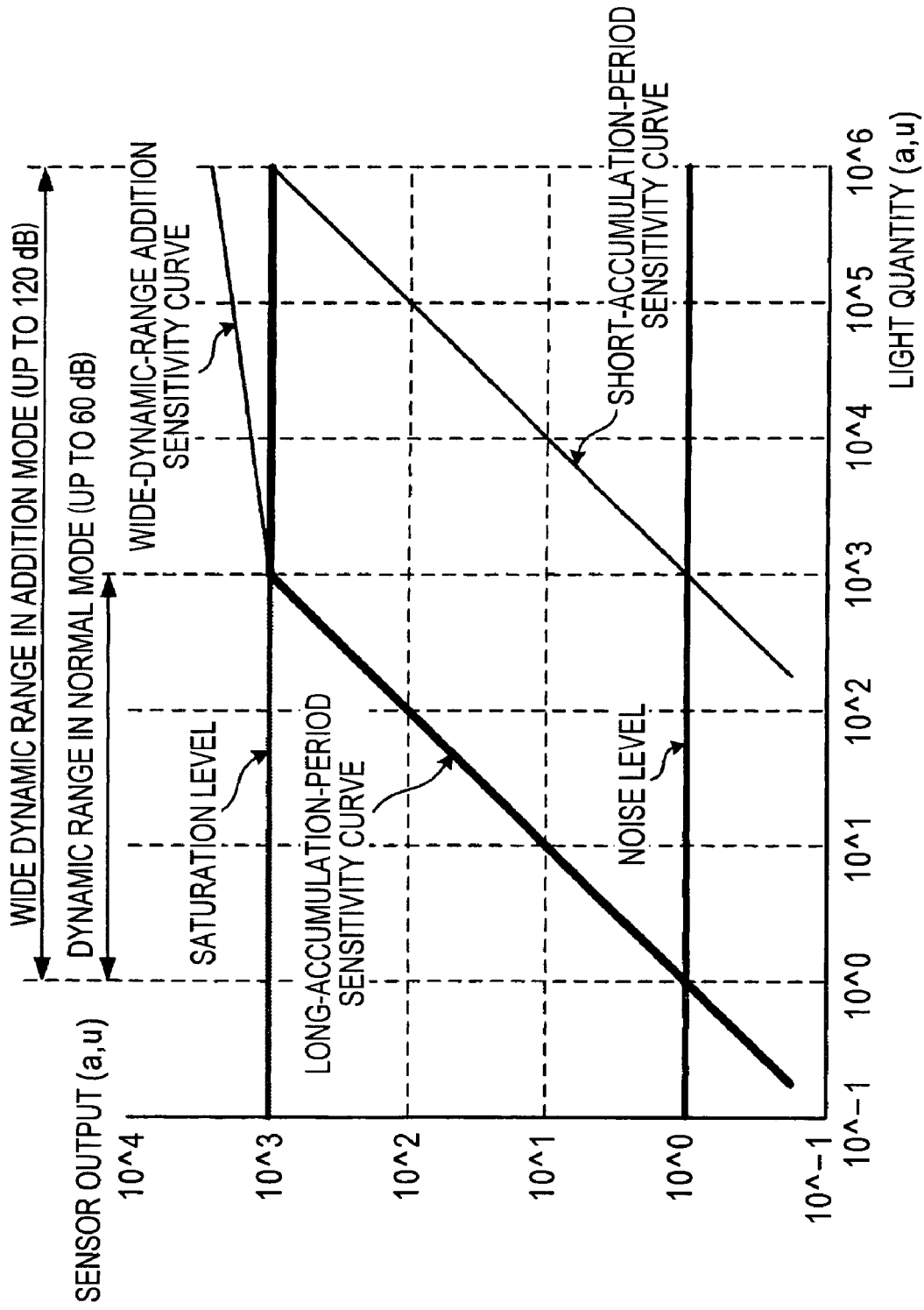
FIG. 4 illustrates a first part of the processing mode of a first example of the temporal addition processing.
Figure 5A:
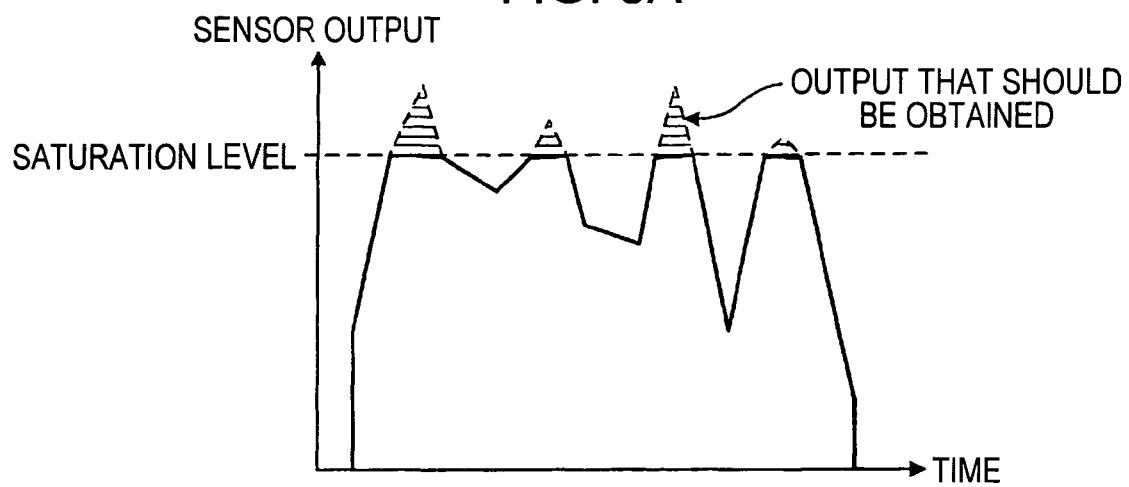
FIG. 5 illustrates a second part of the processing mode of the first example of the temporal addition processing.
Figure 5B:
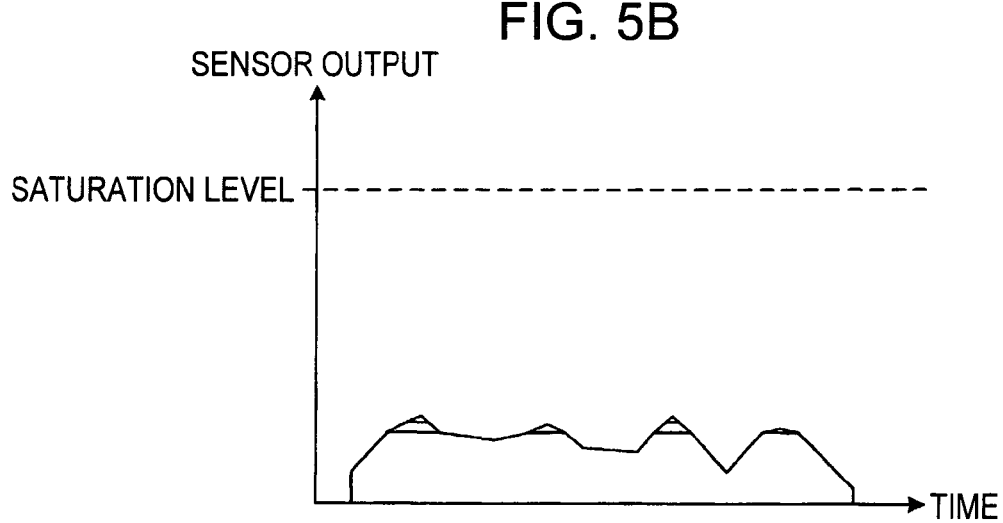
Figure 5C:
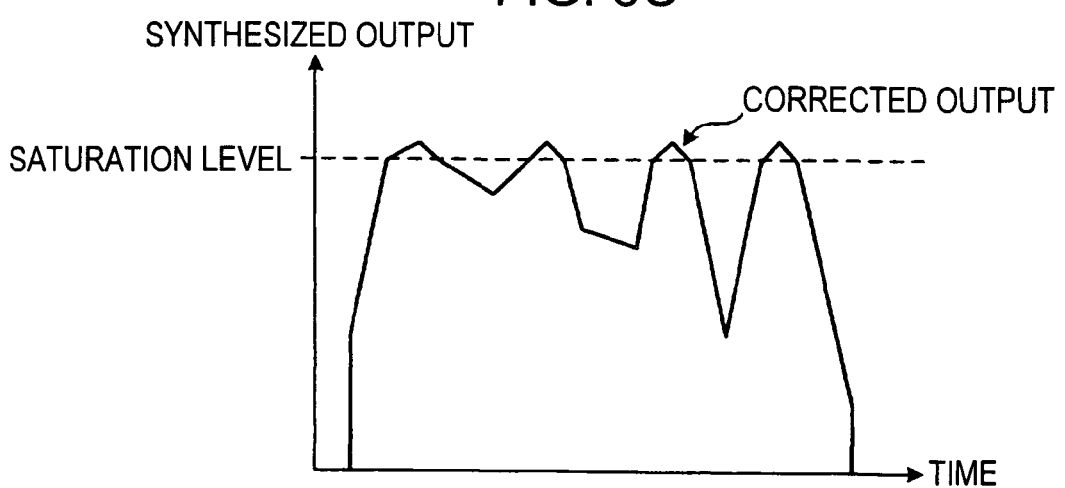

FIG. 3 is a timing chart illustrating the operation of a first example of the temporal addition processing operation in the column AD circuit 25 of the solid-state imaging apparatus 1 of the first embodiment shown in FIG. 1. FIGS. 4 through 5C illustrate processing modes of the temporal addition processing of the first example.

The temporal addition processing described below is characterized in that the dynamic range is increased by performing, as the product-sum operation function, the temporal addition processing. In this case, the temporal addition processing is performed for a plurality of pixel signals captured by different charge accumulation periods. Accordingly, a synthetic image obtained by combining images having different charge accumulation periods can be obtained as a processed image. This processed image (synthetic image) has a wide dynamic range.

For the temporal addition processing, when images having different charge accumulation periods are handled, pixels subjected to addition processing are those disposed at the same position. For a charge-accumulation period range, a long charge accumulation period is set to be generally one frame period. If an electronic shutter function is used, the charge accumulation period can be decreased. In contrast, a short charge accumulation period is set to be one horizontal period (for example, 64 microseconds) or shorter. The reason for this is as follows. Due to the property unique to the CMOS sensors in which the charge accumulation period is different depending on the horizontal line due to the scanning, when reading out the pixel signals by scanning each horizontal line (scanning line), after reading the pixel signal accumulated for the long accumulation period in the same horizontal period, charge is accumulated for the shorter charge accumulation period, and then, the pixel signal accumulated for the shorter accumulation period is immediately read.

Even after reading out the n-bit digital value, the counter 254 can retain the digital value therein. In the temporal addition processing, digital addition processing is executed on a plurality of pixel signals by utilizing the retaining characteristic of the counter 254, which is specifically discussed below.

When performing the addition computation by using the counter 254, the combination of the count modes for the reset components $\Delta V$ and the signal components Vsig in AD conversion for signals to be processed are set to be the same between readout operations. That is, when performing the temporal addition processing, after completing the AD conversion for the first pixels accumulated for a comparatively long accumulation period, without resetting the counter 254, the AD conversion for the second pixel signals is performed for the reset components $\Delta V$ and the signal components Vsig by the same combination of the count modes as that for the AD conversion for the first pixels accumulated for a comparatively long accumulation period. This is specifically discussed below.

As shown in FIG. 3, for the pixel signal V1 of the first pixel accumulated for a comparatively long period, by performing down-counting during the first readout operation and by performing up-counting during the second readout operation, only the electric signal components Vsig in accordance with the quantity of incident light on the unit pixel 3 can be extracted by the difference processing within the counter 254 (t10 to t24). The count value expressed by Equation 2 retained in the counter 254 is an n-bit digital value representing the positive signal voltage Vsig.

Also for the pixel signal V2 of the second pixel accumulated for a comparatively short period, down-counting is performed during the first readout operation, and up-counting is performed during the second readout operation. That is, AD conversion is performed by the same combination of count modes as that for the first pixel signal V1 (t30 to t44). Accordingly, the subtraction processing expressed by Equation 1 is automatically performed in the counter 254, and the resulting count value is retained in the counter 254.

AD conversion for the pixel signal V2 of the second pixel accumulated for a comparatively short period is performed by the same combination of the count modes as that for the pixel signal V1 of the first pixel accumulated for a comparatively long period. Accordingly, the count value retained in the counter 254 becomes the n-bit digital value representing a negative positive voltage (Vsig2), as expressed by Equation 3.

Equation 3:

(Count value in the second comparison period)−(count value in the first comparison period) =−(signal components $Vsig2$+reset components $\Delta V2$+offset components in the column $AD$ circuit 25) +(reset components $\Delta V2$+offset components in the column $AD$ circuit 25) =−(signal components $Vsig2$)   (3)

Upon completing the second counting operation on the pixel signal V1 of the first pixel accumulated for a comparatively long period, the first up-counting operation on the pixel signal V2 of the second pixel accumulated for a comparatively short period is started without resetting the count value retained in the counter 254. Then, the count value expressed by Equation 2 is added to the count value expressed by Equation 3.

Accordingly, the count value retained in the counter 254 after completing the second counting operation on the pixel signal V2 of the second pixel accumulated for a comparatively short period is the n-bit digital value representing the addition computation result (Vsig1+Vsig2) between the two pixel signals V1 and V2, as expressed by Equation 4.

Equation 4:

The count value for the first pixel signal +(second comparison period)−(first comparison period) = (signal components Vsig+reset components ΔV+offset components in the column AD circuit 25) +(reset components ΔV+offset components in the column AD circuit 25) =(signal components Vsig1)+(signal components Vsig2) (4)

At a predetermined timing (t48) after the completion of the AD conversion for a plurality of pixel signals having different charge accumulation periods, the communication/timing controller 20 instructs the horizontal scanning circuit 12 to read out the pixel data. In response to this instruction, the horizontal scanning circuit 12 sequentially shifts the horizontal selection signals CH(i) to be supplied to the counters 254 via the control lines 12c.

Then, the count value expressed by Equation 4 stored/retained in the counter 254, i.e., the n-bit digital data representing the addition result (Vsig1+Vsig2) between the two pixel signals V1 and V2, can be sequentially output to the outside the column processor 26 or the outside the chip having the pixel portion 10 from the output terminal 5c via the n horizontal signal lines 18. Thereafter, the operation is similarly repeated for pixel signals of another row. As a result, computed data D2 representing the two-dimensional addition image indicating the addition computation result between a plurality of pixel signals having different accumulation periods can be obtained.

It is now assumed that the dynamic range of the image sensor is 60 dB and that the long charge accumulation period is set to be about one frame period, for example, about ⅟15 milliseconds, and the short charge accumulation period is set to be one horizontal period or shorter, about ⅟15 microseconds. In this case, as shown in FIG. 4, the sensor output with respect to the light quantity for the long accumulation period changes up to three orders of magnitudes in accordance with a change in the light quantity (see the long-accumulation-period sensitivity curve). The sensor output with respect to the light quantity for the short accumulation period also changes up to three orders of magnitudes (see the short-accumulation-period sensitivity curve). However, the light quantity detected by the pixels accumulated for the short accumulation period differs from that by the pixels accumulated for the long accumulation period by three orders of magnitudes.

According to the addition processing result (Vsig1+Vsig2) obtained by adding the outputs obtained by the first and second different accumulation periods, the dynamic range of six orders of magnitudes, i.e., 120 dB, can be implemented. For example, as shown in FIGS. 5A through 5C, an image having saturated portions detected by the long accumulation period shown in FIG. 5A can be compensated for by an image detected by the short accumulation period shown in FIG. 5B. Thus, the image portions at the saturation level or higher that cannot be output only by one accumulation period can be reproduced, as shown in FIG. 5C.

The "one field period" is a period in which an image is read by two-dimensionally scanning the imaging plane (more specifically, one vertical scanning period), and the "one frame period" is a period required for forming an image by all pixels on the imaging plane. When sequential scanning (progressive scanning) for scanning all rows is performed in the vertical direction, the "one field period" is equal to the "one frame period". In contrast, when interfaced scanning is performed in which some rows are sequentially scanned in the vertical direction in the first vertical scanning operation and the remaining rows are scanned in the vertical direction in the second vertical scanning operation, "k fields" are equal to "one frame". "k" indicates the number of scanning operations, and normally, k is 2. Regardless of the progressive scanning or the interlaced scanning, one vertical scanning period for reading an image by two-dimensionally scanning the imaging plane may be referred to as "one frame" in a broad sense. In this specification, the frame in the following description means the frame in a broad sense.

As described above, as the application of the temporal addition processing, the following operation is performed. When conducting AD conversion by performing the counting operation for a plurality of pixel signals having different charge accumulation periods at the same position, digital data obtained for one of the pixel signals is used as the initial value for the counting operation for the other pixel signal (pixel signal to be subjected to the second counting operation). Accordingly, after conducting AD conversion by performing the counting operation for the other pixel signal, n-bit digital data indicating the addition computation result for all the pixel signals can be automatically obtained and output as the computed data D2. In this embodiment, as the computed data D2, a signal output which is not easily saturated for a larger light quantity can be obtained, and data that can increase the dynamic range can be obtained. The bit width of the digital image data can be maintained to n bits while implementing a wide dynamic range, in other words, the bit width can be compressed. Accordingly, an image having a wide dynamic range in accordance with the light quantity while suppressing the overexposed highlight or the underexposed shadow can be obtained.

Without additional circuits, such as an adder and a line memory device, digital-value addition processing for a plurality of pixel signals having different charge accumulation periods at the same position can be performed according to the on-chip method. Since images having different accumulation periods can be combined as a digital value, the wide dynamic range can be implemented with a simple structure without the need to add external circuits, such as a frame memory, or internal circuits.

In the same horizontal period, after reading out a pixel signal accumulated for a long accumulation period, charge is accumulated for a short accumulation period, and then, the pixel signal accumulated for the short accumulation period is read. Accordingly, the long-period accumulation signal and the short-period accumulation signal are sequentially output substantially at the same timing, thereby eliminating the need to provide a memory for synchronizing the two signals with each other.

Since the dynamic range is increased by combining two pixel signals having different accumulation periods (if necessary, the number of pixel signals having different accumulation periods may be increased), a device having a normal pixel structure can be used without requiring a dedicated pixel structure, such as an inter-pixel memory. Thus, the type of sensor device is not restricted.

Temporal Addition Processing Operation; Second Example

Figure 6:
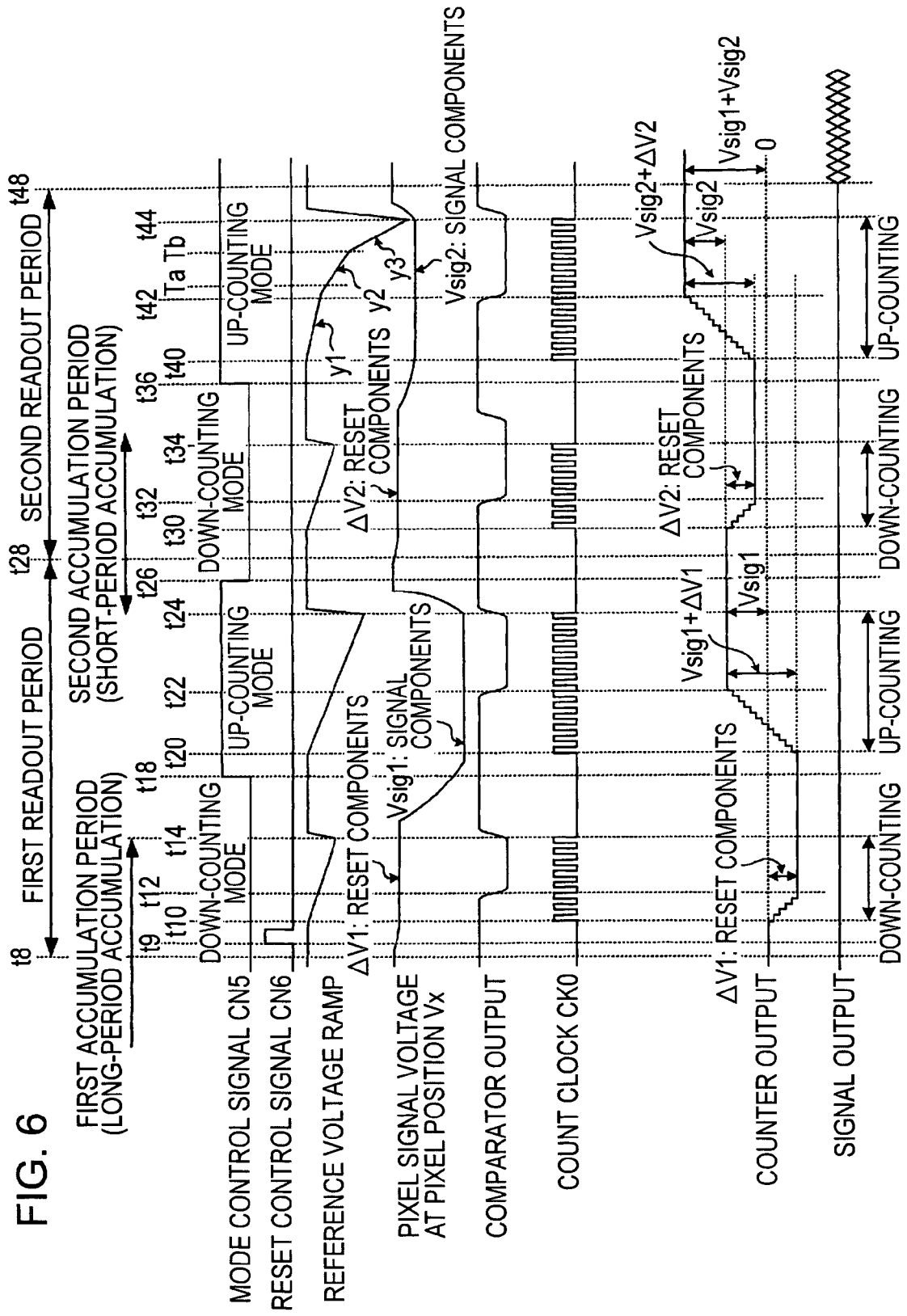
FIG. 6 is a timing chart illustrating a second example of the temporal addition processing operation in the column AD circuits of the solid-state imaging apparatus of the first embodiment shown in FIG. 1.
Figure 7:
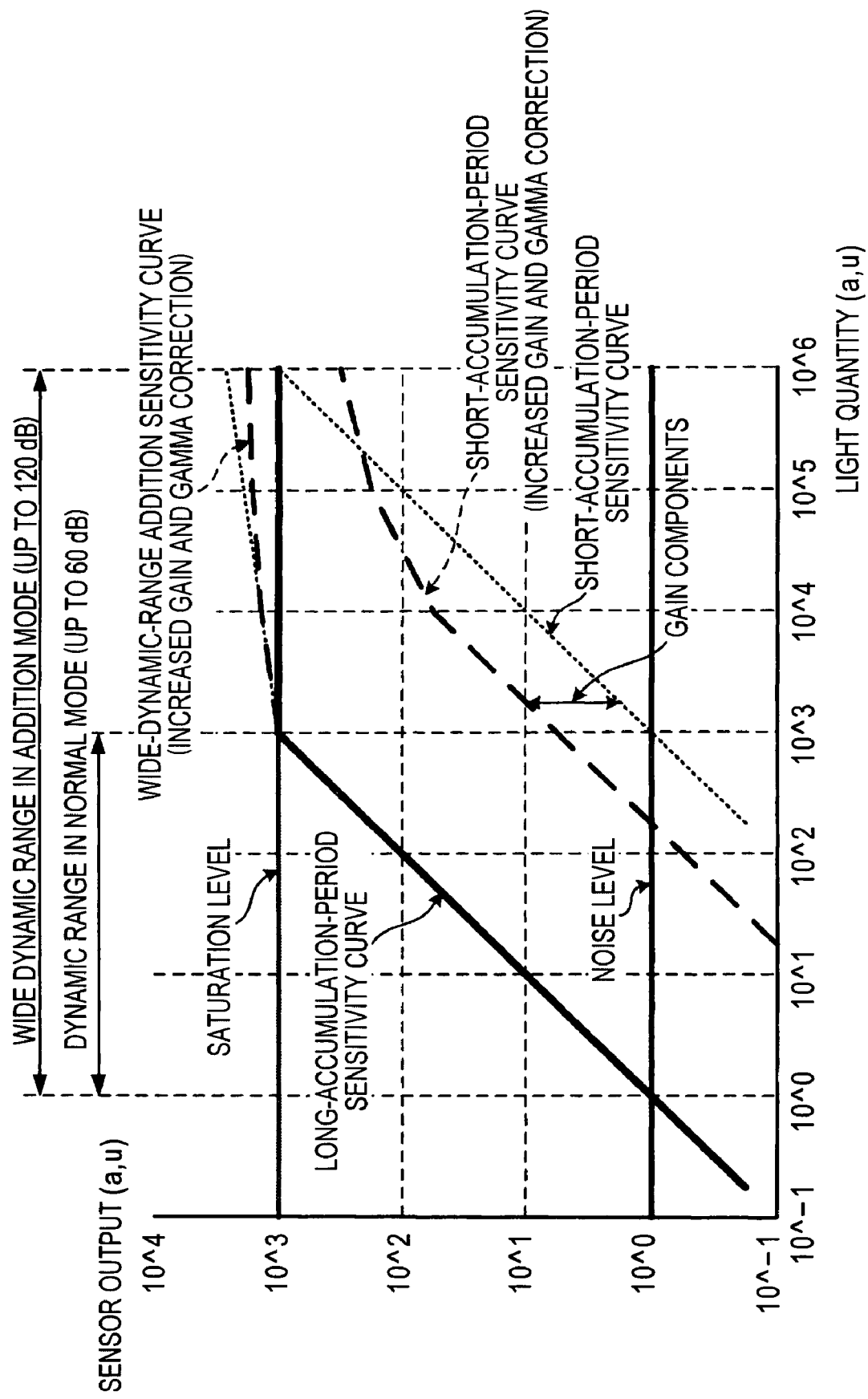
FIG. 7 illustrates a mode of the second example of the temporal addition processing.

FIG. 6 is a timing chart illustrating a second example of the temporal addition processing operation in the column AD circuit 25 of the solid-state imaging apparatus 1 of the first embodiment shown in FIG. 1. FIG. 7 illustrates a mode of the temporal addition processing of the second example. In the second example, the reference signal generator 27 in the first example is modified.

In actuality, in the mode of the first example, if addition processing is simply performed, the ideal knee characteristic in which the sensor output with respect to the light quantity matches the luminosity cannot be achieved. That is, the sensor output does not match the human visual characteristic in which the brightness is identified in proportion to the logarithm of the light quantity.

To solve this problem, it is preferable that, by considering the luminosity, the amount by which the reference signal used for comparison processing is changed over time is adjusted so that the coefficient for image signals subjected to addition processing is set. Particularly, it is preferable that the amount by which the reference signal is changed over time is adjusted for images obtained under a comparatively short accumulation period. Then, the luminosity can be adjusted without causing saturation of high level signals that would be saturated under the condition of a normal accumulation period.

More specifically, when conducting AD conversion for pixel signals accumulated for the short accumulation period, as shown in FIG. 6, the gradient of the reference signal RAMP generated by the reference signal generator 27 is preferably changed in several levels instead of being changed linearly. Alternatively, instead of changing the gradient of the reference signal RAMP in different levels while maintaining the linearity, it may be continuously and progressively changed by using a high-order function, such as a quadric function.

In this case, in accordance with the logarithmic characteristic of the human eye, the grayscale precision in a dark place is maintained so that the human eye is sensitive to a change in the brightness in a dark place, and the grayscale precision in a bright place is decreased so that the human eye is dull to a change in the brightness in a bright place. More specifically, it is preferable that the gradient of the reference potential RAMP is set to be smaller at the initial stage of the AD conversion so that the coefficient can be large (higher gain), and as the AD conversion proceeds, the gradient of the reference potential RAMP is increased. With this arrangement, the knee characteristic in which a high luminance range is compressed in accordance with the luminous characteristic of the human can be achieved.

To achieve this characteristic, for example, the cycle of the count clock CKdac to be supplied to the DA conversion circuit 27a of the reference signal generator 27 is progressively facilitated while the DA conversion circuit 27a reduces the voltage for each clock by ΔRAMP. For example, the communication/timing controller 20 supplies a clock which is scaled down from the reference clock CKdac by the factor of 1/ma (for example, ½) to the reference signal generator 27 from time t40 to time Ta so that a potential having a straight line y1 with a coefficient ma (for example, 2) is supplied. Then, from time Ta to time Tb, the communication/timing controller 20 supplies the reference count clock CKdac so that a potential having a straight line y2 is supplied, and after time Tb, the communication/timing controller 20 supplies a clock which is scaled up from the reference count clock CKdac by the factor of mb (for example, 2) so that a potential having a straight line y3 with a coefficient 1/mb (for example, ½) is supplied.

Alternatively, while setting the cycle of the count clock CKdac supplied to the DA conversion circuit 27a of the reference signal generator 27 to be constant, the counter output value x and the gradient (rate of change) β contained in the control data CN4 are progressively adjusted. For example, from time t40 to time Ta, the potential calculated by y1=α1 (initial value)−β1*x is output. From time Ta to time Tb, the potential calculated by y2=α2 (initial value)−β2*x is output. After time Tb, the potential calculated by y3=α3 (initial value)−β3*x is output. It should be noted that α1<α2<α3, for example, 1/2:1:2, and β1<β2<β3.

With this arrangement, for the short-accumulation-period sensitivity curve, as shown in FIG. 7, gamma correction is conducted in the high luminance range while providing gain components, that is, the knee characteristic in which the high luminance range can be compressed in accordance with the luminous characteristic of the human can be achieved.

Although in any of the above-described examples the reference signal RAMP is changed linearly, it may be changed non-linearly, such as exponentially or by using a quadric function.

As described above, if the gradient of the reference signal RAMP generated by the reference signal generator 27 is progressively changed when AD conversion is conducted on the pixel signals accumulated for the short accumulation period, a wide dynamic range can be implemented by combining different accumulation periods, and also, gamma correction can be made to the sensitivity characteristic, thereby implementing a more natural synthesized image. The difference in the sensitivity caused by the different accumulation periods can be naturally compensated for, and a more natural image can be synthesized.

Figure 8:
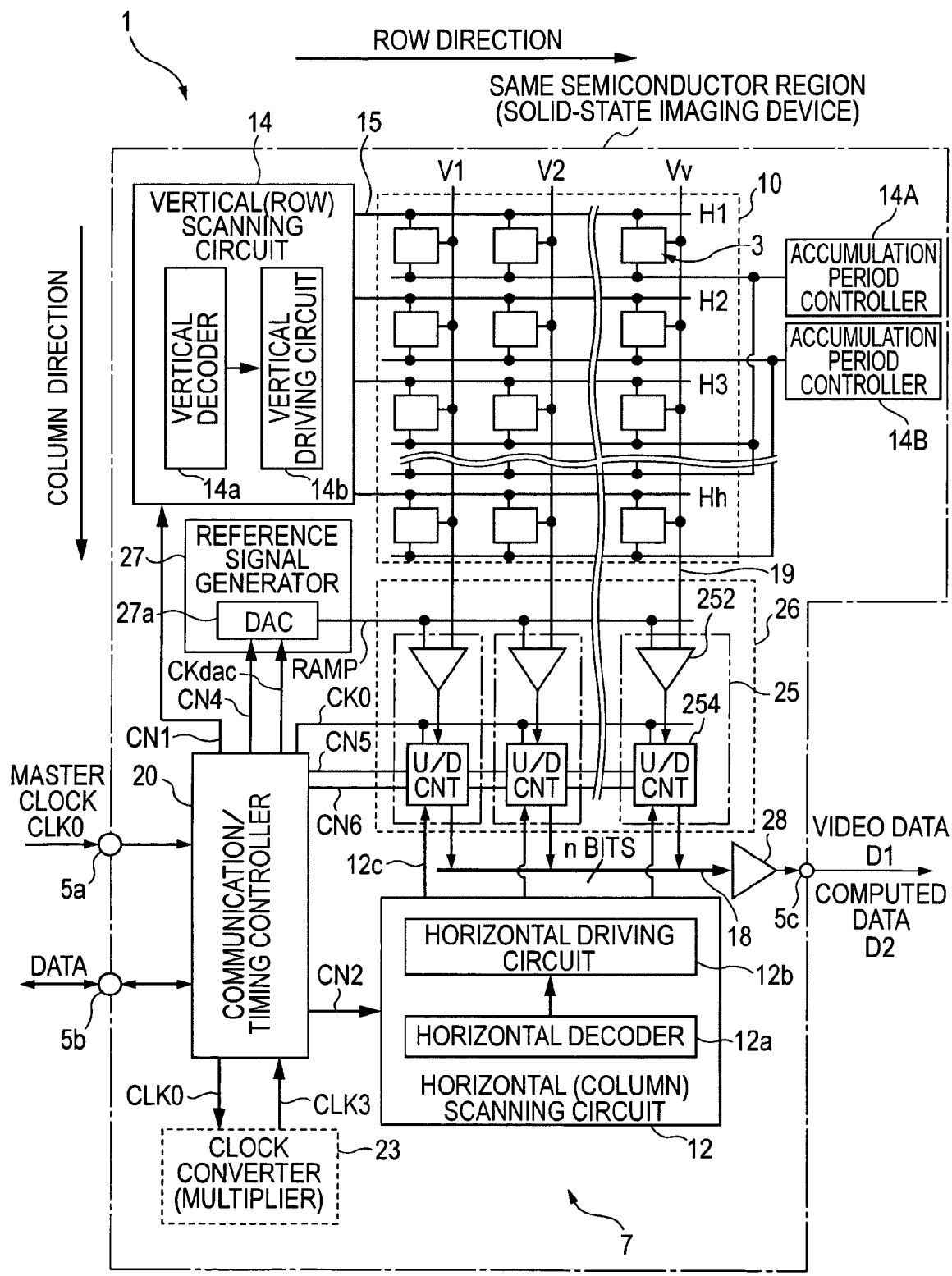
FIG. 8 is a schematic diagram illustrating a CMOS solid-state imaging apparatus according to a second embodiment of the present invention.
Figure 9:
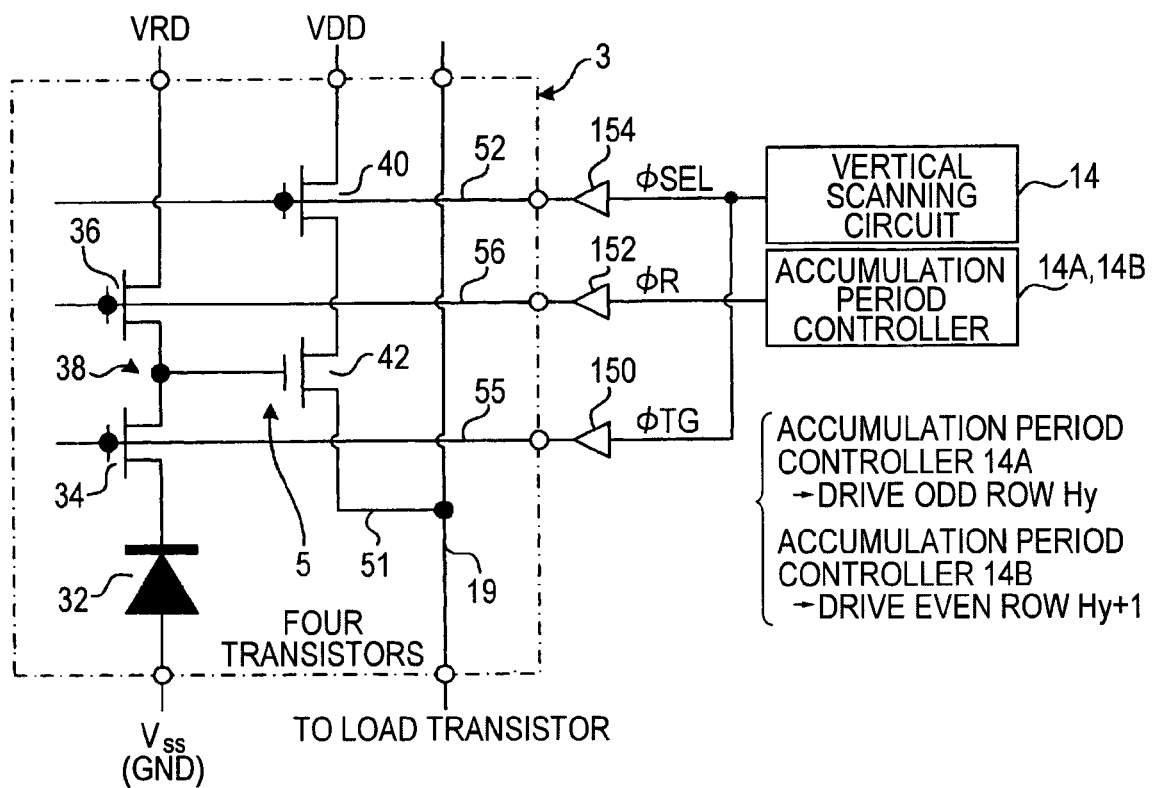
FIG. 9 illustrates the relationship between an example of the configuration of a unit pixel and a drive circuit.

Second Embodiment; Configuration of Solid-State Imaging Apparatus; Extension of Short Accumulation Period FIG. 8 is a schematic diagram illustrating a CMOS solid-state imaging apparatus according to a second embodiment of the present invention. FIG. 9 illustrates the relationship between an example of the configuration of the unit pixel 3 and a drive circuit.

The solid-state imaging apparatus 1 of the second embodiment includes dedicated functions for controlling the long and short accumulation periods (exposure time), independently of the vertical scanning circuit 14, i.e., an accumulation period controller 14A for controlling the long accumulation period and an accumulation period controller 14B for controlling the short accumulation period.

The unit pixel 3 has a 4TR structure, which is common for CMOS sensors, as shown in FIG. 9. Alternatively, though it is not shown, as disclosed in Patent Number 2708455, the pixel unit 3 having a 3TR, such as an amplifying transistor connected to a drain line (DRN) so as to amplify a signal voltage in accordance with signal charge generated by the charge generator, a reset transistor for resetting the charge generator, and a readout selection transistor (transfer gate) which is scanned by a vertical shift register via a transfer line (TRF), may be used.

The unit pixel 3 having a 4TR shown in FIG. 9 includes a charge generator 32, which serves as a photoelectric conversion function for converting light into electric charge which also serves as a charge accumulation function for accumulating electric charge, a readout selection transistor 34, which is an example of a charge reader (transfer gate/readout gate), a reset transistor 36, which is an example of a reset gate, a vertical selecting transistor, and a source-follower amplifying transistor 42, which is an example of a detector device for detecting a change in the potential of a vertical selection transistor 40 and a floating diffusion 38.

The readout selection transistor 34 is driven by a transfer driving buffer 150 via a transfer wiring (readout selection line). The reset transistor 36 is driven by a reset driving buffer 152 via a reset wiring 56. The vertical selection transistor 40 is driven by a selection driving buffer 154 via a vertical selection line 52.

The unit pixel 3 includes a pixel signal generator 5 formed of a FDA (Floating Diffusion Amp) including the floating diffusion 38, which is an example of a charge injection device having a charge accumulation function. The floating diffusion 38 is a diffusion layer having a parasitic capacitance.

The reset transistor 36 in the pixel signal generator 5 is connected at its source to the floating diffusion 38 and at its drain to the power source VDD, and the reset pulse RST is input into the gate (reset gate RG) of the reset transistor 36 from the reset driving buffer 152.

The vertical selection transistor 40 is connected at its drain to the power source VDD, at its source to the drain of the amplifying transistor 42, and its gate (referred to as the "vertical selection gate SELV") to the vertical selection line 52. A vertical selection signal is applied to the vertical selection line 52. The amplifying transistor 42 is connected at its gate to the floating diffusion 38, at its drain to the source of the vertical selection transistor 40, and at its source to the vertical signal line 19 via a pixel line 51.

With this configuration, since the floating diffusion 38 is connected to the gate of the amplifying transistor 42, the amplifying transistor 42 outputs a signal corresponding to the potential (hereinafter referred to as the "FD potential") of the floating diffusion 38 to the vertical signal line 19 via the pixel line 51. The reset transistor 36 resets the floating diffusion 38. The readout selection transistor (transfer transistor) 34 transfers the signal charge generated in the charge generator 32 to the floating diffusion 38. Many pixels are connected to the vertical signal line 19, and when a pixel is selected, the vertical selection transistor 40 of only the selected pixel is turned ON. Then, only the selected pixel is connected to the vertical signal line 19, and a signal of the selected pixel is output to the vertical signal line 19.

In the second embodiment, the accumulation period controller 14A for controlling the long accumulation period controls the reset transistor 36 of the unit pixel 3 on the odd row Hy via the reset driving buffer 152 and the reset wiring 56. The accumulation period controller 14B for controlling the short accumulation period controls the reset transistor 36 of the unit pixel 3 on the even row Hy+1 via the reset driving buffer 152 and the reset wiring 56.

In the configuration of the first embodiment, in the same horizontal period, after reading pixel signals accumulated for a long accumulation period, pixel signals are accumulated for a short accumulation period, and then, the pixel signals accumulated for the short accumulation period are immediately read. Accordingly, since the short accumulation period is equal to one horizontal period (for example, 64 microseconds) or shorter, there is no flexibility in the charge accumulation period.

In contrast, in the second embodiment, the long accumulation period controller 14A and the short accumulation period controller 14B are assigned to different rows, and control the long and short accumulation periods, respectively. Accordingly, by using two pixels (that is, two rows) in the vertical column direction, the pixel of one row (in this example, the odd row Hy) can be assigned to the long accumulation period, while the pixel of the other row (in this example, the even row Hy+1) can be assigned to the short accumulation period. With this arrangement, the accumulation period can be flexibly set for each row, and thus, the short accumulation period becomes more flexible. This significantly increases the flexibility to improve the dynamic range, and the ease of operation can be enhanced.

Instead of setting the accumulation period for each row by the vertical scanning circuit 14, the dedicated accumulation period controllers 14A and 14B control the accumulation periods, and thus, the control of the accumulation period can be facilitated.

Temporal Addition Processing Operation; Second Embodiment

Figure 10:
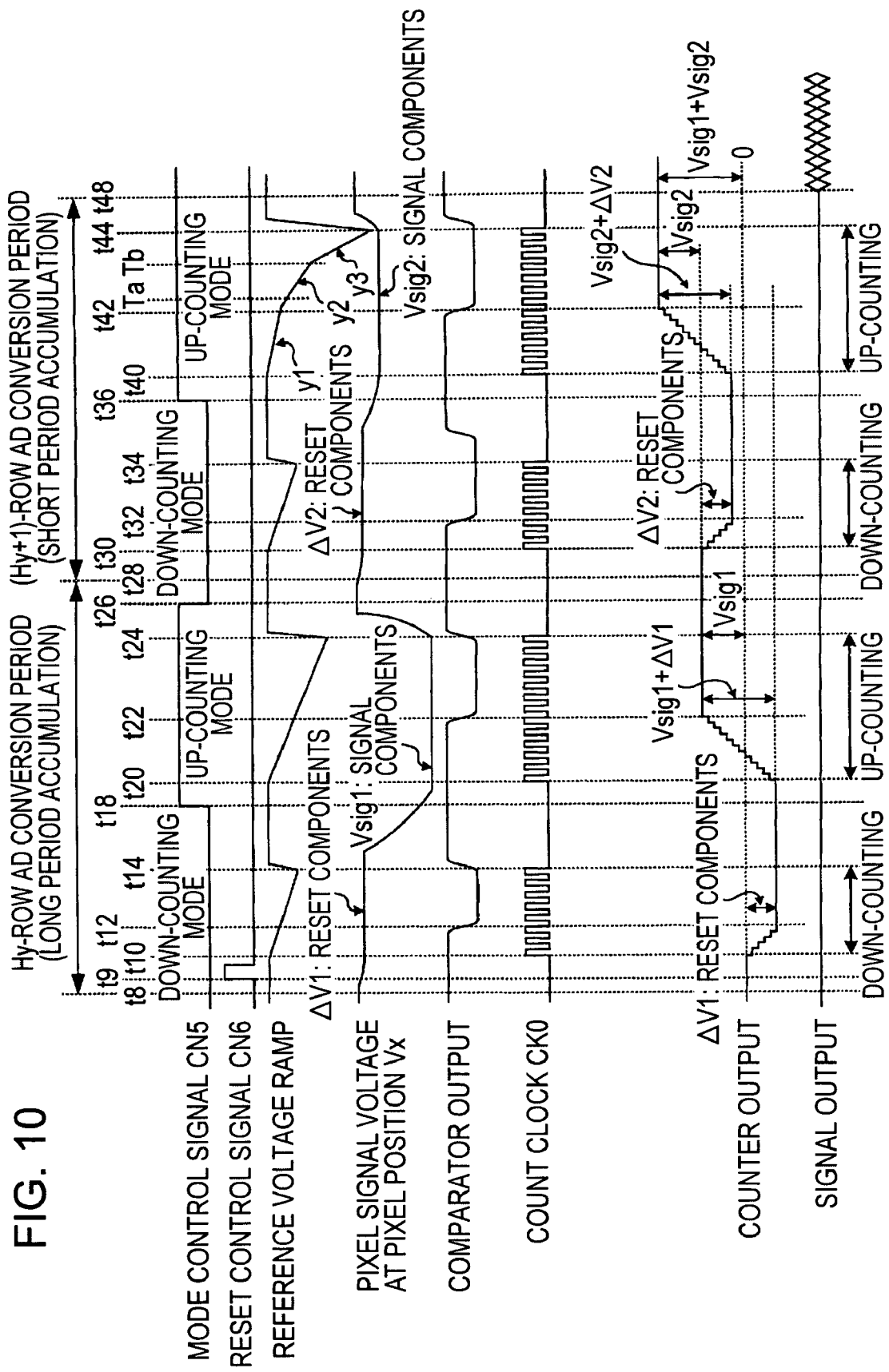
FIG. 10 is a timing chart illustrating the temporal addition processing operation in the column AD circuits of the solid-state imaging apparatus of the second embodiment shown in FIG. 8.

FIG. 10 is a timing chart illustrating temporal addition processing operation in the column AD circuit 25 of the solid-state imaging apparatus 1 of the second embodiment shown in FIG. 8. The temporal addition processing operation shown in FIG. 10 is a modification of the second example (with gamma correction) of the first embodiment shown in FIG. 6, and is also applicable to the first example (without gamma correction) of the first embodiment shown in FIG. 3.

In FIG. 10, it can be considered that the first readout period in the second example of the first embodiment shown in FIG. 6 is substituted by the AD conversion period for the Hy row and the second readout period in FIG. 6 is substituted by the AD conversion period for the Hy+1 row. The temporal addition processing operation is similar to that of the first example or the second example of the first embodiment, except that the two subject pixel signals V1 and V2 having different accumulation periods are located at the same position (first embodiment) or they are located in different rows in the same vertical column (second embodiment).

Accordingly, in this embodiment, the count value retained in the counter 254 after the second counting operation for the pixel signal V2 of the Hy+1 row accumulated for a comparatively short period is finished is the n-bit digital value indicating the addition computation result (Vsig1+Vsig2) for the two pixel signals V1 and V2 having different accumulation periods, as expressed by Equation 4, thereby obtaining data having an increased dynamic range.

Since addition processing is performed based on pixel signals of two rows having a slight difference (for one horizontal period) in the readout time, the need to provide a memory for synchronizing the two signals with each other can be eliminated. That is, in the second embodiment, digital-value addition computation of a plurality of pixel signals having different accumulation periods can be performed by the on-chip method without the need to provide addition circuits such as an adder and a line memory device. Since images having different accumulation periods can be combined as a digital value, the wide dynamic range can be implemented with a simple structure without the need to add external circuits, such as a frame memory, or internal circuits.

While the present invention has been described with reference to the disclosed embodiments, it is to be understood that the technical scope of the invention is not limited to the disclosed embodiments. On the contrary, the invention is intended to cover various modifications and equivalent arrangements without departing from the spirit of the invention, and the various modifications and arrangements are encompassed within the technical scope of the invention.

The above-described embodiments do not restrict the claimed invention, and all the combinations of the features disclosed in the embodiments are not necessarily essential as the solving means for the invention. The above-described embodiments include various modes of the invention, and by suitably combining a plurality of features disclosed in the embodiments, various inventions can be extracted. Even if some of the features disclosed in the embodiments are deleted, the resulting features can be extracted as the invention as long as they offer advantages.

For example, in the foregoing embodiments, although AD conversion functions are disposed in the column regions located at positions to read out signals from the pixel portion 10, they may be provided at another portion. For example, analog pixel signals may be output to the horizontal signal line 18, and then, they are converted into digital signals and are delivered to the output circuit 28.

Also in this case, a plurality of pixel signals subjected to the addition computation are compared with the AD conversion reference signal, and while the comparison processing is being performed, the counting operation is performed in one of the down-counting mode and the up-counting mode. Then, the count value when the comparison processing is finished is stored. In this case, the digital data obtained for one of the plurality of pixel signals subjected to the operation is used as the initial value for the counting operation, and thus, when AD conversion is conducted for the other pixel signal, the digital data representing the addition computation result and indicating a wide dynamic range image signal can be obtained as the counting result.

As a result, a memory device for storing the counting result of each of the plurality of pixel signals subjected to the addition computation for obtaining a wide dynamic range image signal can be implemented by a latch function of the counter, and it is not necessary to provide, separately from the counter, a dedicated memory device for retaining the AD converted data. Only one AD conversion function is required for all the vertical columns, and the circuit scale can be reduced compared to that in the foregoing embodiments although fast conversion processing is required.

In the aforementioned embodiments, the counting operation after switching the count modes is started from the final count value before switching the count modes. In this case, a special arrangement is not required for switching the modes if an up/down counter for outputting the count value in synchronization with the count clock CK0 is used.

However, if an asynchronous up/down counter suitable for a fast operation since the operation limit frequency is determined by only the limit frequency of the first flip-flop (counter basic element) is used, the count value is lost when switching the count modes, and thus, the correct counting operation cannot be performed while maintaining the same value before and after switching the count modes. Accordingly, an adjustment processor for allowing the counting operation after switching the count modes to start from the count value before switching the count modes is preferably disposed. Details of the adjustment processor are not given here. If addition processing between a plurality of signals is performed, the count modes are the same for the first and second counting operations, and thus, the above-described arrangement is not necessary.

In the above-described embodiments, it is now assumed that, concerning a pixel in which the signal components Vsig appear after the reset components ΔV (reference components) in the time sequential order, and the second-stage processor processes a signal having a positive sign (a signal having a higher level has a greater positive value), true components of the pixel are determined. In this case, as the first processing operation, the comparison processing and the down-counting operation are performed for the reset components ΔV (reference components), and as the second processing operation, the comparison processing and the up-counting operation are performed for the signal components Vsig. However, regardless of the time-sequential order in which the reference components and the signal components appear, the combination of the signal components and the count mode and the processing order are arbitrary. Depending on the processing order, the digital data obtained as a result of the second operation may be a negative value. In this case, sign inversion or correction computation can be performed.

According to the device architecture of the pixel portion 10, the reset components ΔV (reference components) must be read after the signal components Vsig. If the second-stage processor processes signals having positive sings, it is more efficient to perform the comparison processing and the down-counting operation for the signal components Vsig as the first operation and to perform the comparison processing and the up-counting operation for the reset components ΔV (reference components) as the second operation.

In the foregoing embodiments, assuming that signal components Vsig appear after reset components ΔV (reference components) for the same pixel, difference processing for finding true signal components is performed when performing the addition computation between a plurality of pixel signals having different accumulation periods. If only signal components Vsig can be subjected to the processing without considering the reset components ΔV (reference components), the difference processing for finding the true signal components can be omitted.

In the aforementioned embodiments, the up/down counter is used in common to perform the counting operation by switching the operation modes regardless of the operation mode. The counter is not restricted to an up/down counter that can switch the modes as long as it performs the counting operation by a combination of the down-counting mode and the up-counting mode.

Figure 11A:
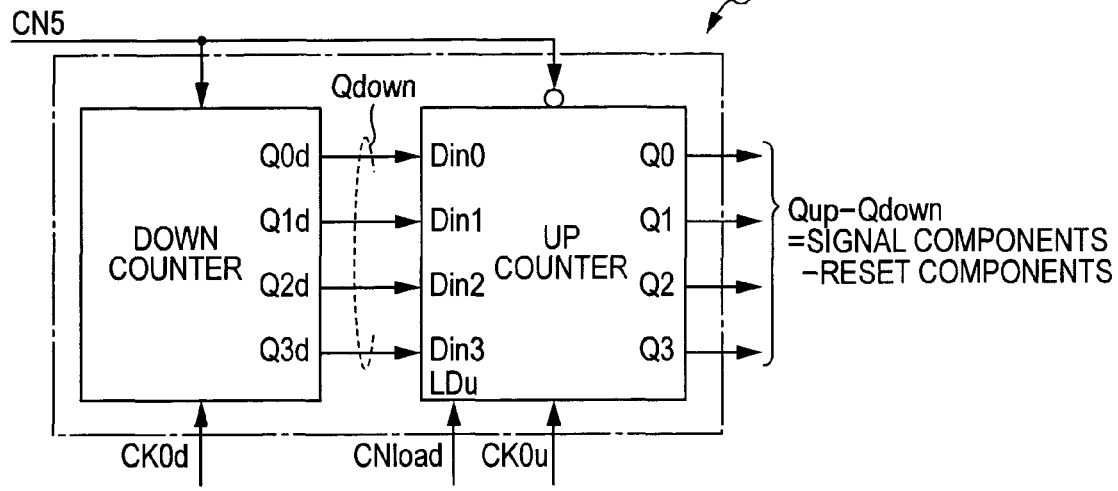
FIG. 11 is a circuit block diagram illustrating a modified example of the counter.

For example, the counter may be formed by a combination of a down counter circuit for performing down-counting and an up counter circuit for performing up-counting. In this case, counter circuits that can receive a desired initial value by using known art are preferably used. For example, if up-counting is performed after down-counting, as shown in FIG. 11A, the down counter circuit is operated for the first counting operation, and then, the up counter circuit is operated for the second counting operation. In this case, before starting the up-counting operation after switching the count modes by the count-mode-switching control signal CN5, the load control signal CNld for setting the initial value is supplied to the load terminal LDu of the up counter circuit, thereby setting the down count value obtained in the down counting operation as the initial value in the up counter circuit.

Figure 11B:
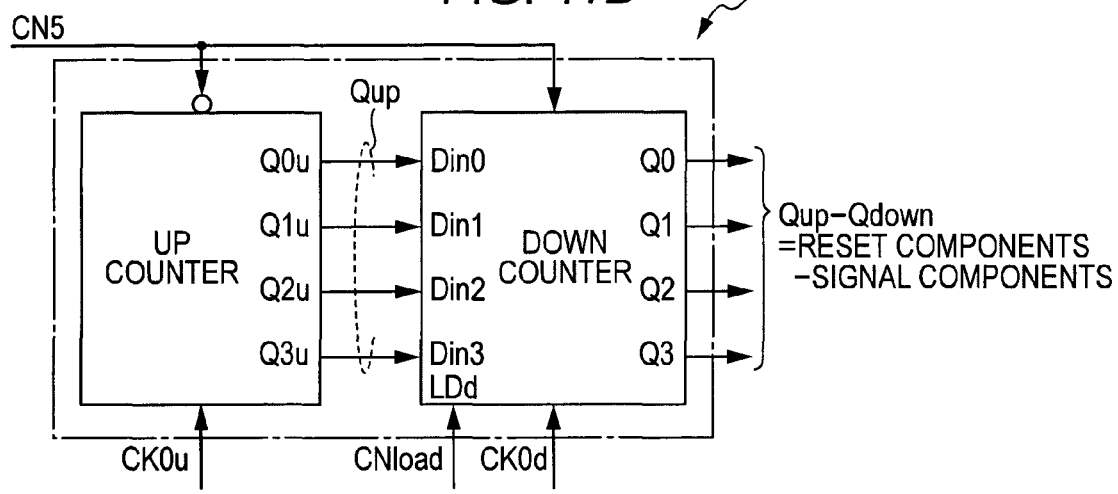

If, for example, down-counting is performed after up-counting, as shown in FIG. 11B, an up counter circuit is operated for the first counting operation, and then, a down counter circuit is operated for the second counting operation. In this case, before starting the down-counting operation after switching the count modes by the count-mode-switching control signal CN5, the load control signal CNld for setting the initial value is supplied to the load terminal LDd of the down counter circuit, thereby setting the up count value obtained in the up-counting operation in the down counter circuit.

In performing addition processing between a plurality of signals, before starting the counting operation in the second-stage count circuit, the initial value is set in a manner similar to the subtraction processing between a plurality of signals while maintaining the same count modes for the first and second counting operations.

With the above-described arrangements, in either of the configuration shown in FIG. 11A or 11B, to obtain the output of the second-stage counter circuit, the subtraction processing between a plurality of signals (including the reference components and the signal components) can be directly performed. This eliminates the need to provide a special addition circuit for calculating the difference between a plurality of signals. Additionally, the transferring of data to a subtractor is not necessary, and thus, an increase in noise, the current, or the power consumption can be suppressed.

If a counter configured by a combination of a down counter circuit and an up counter circuit is used, instead of setting the count value obtained in the first counting operation as the initial value for the second counting operation, the second counting operation may be started from zero.

Figure 11C:
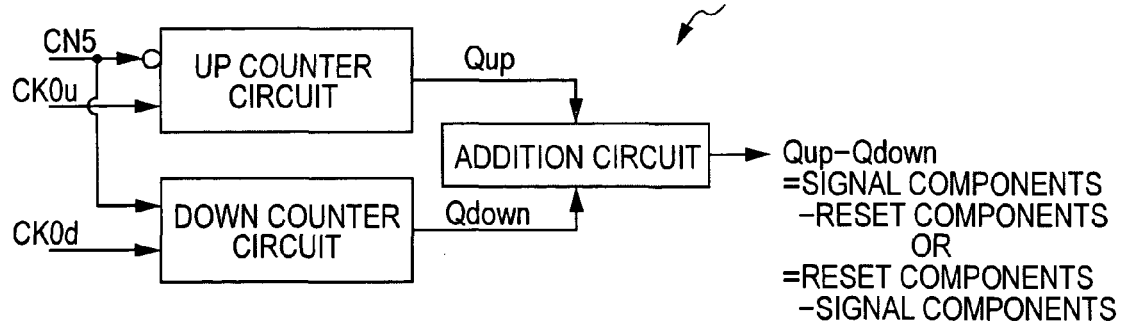
Figure 12:
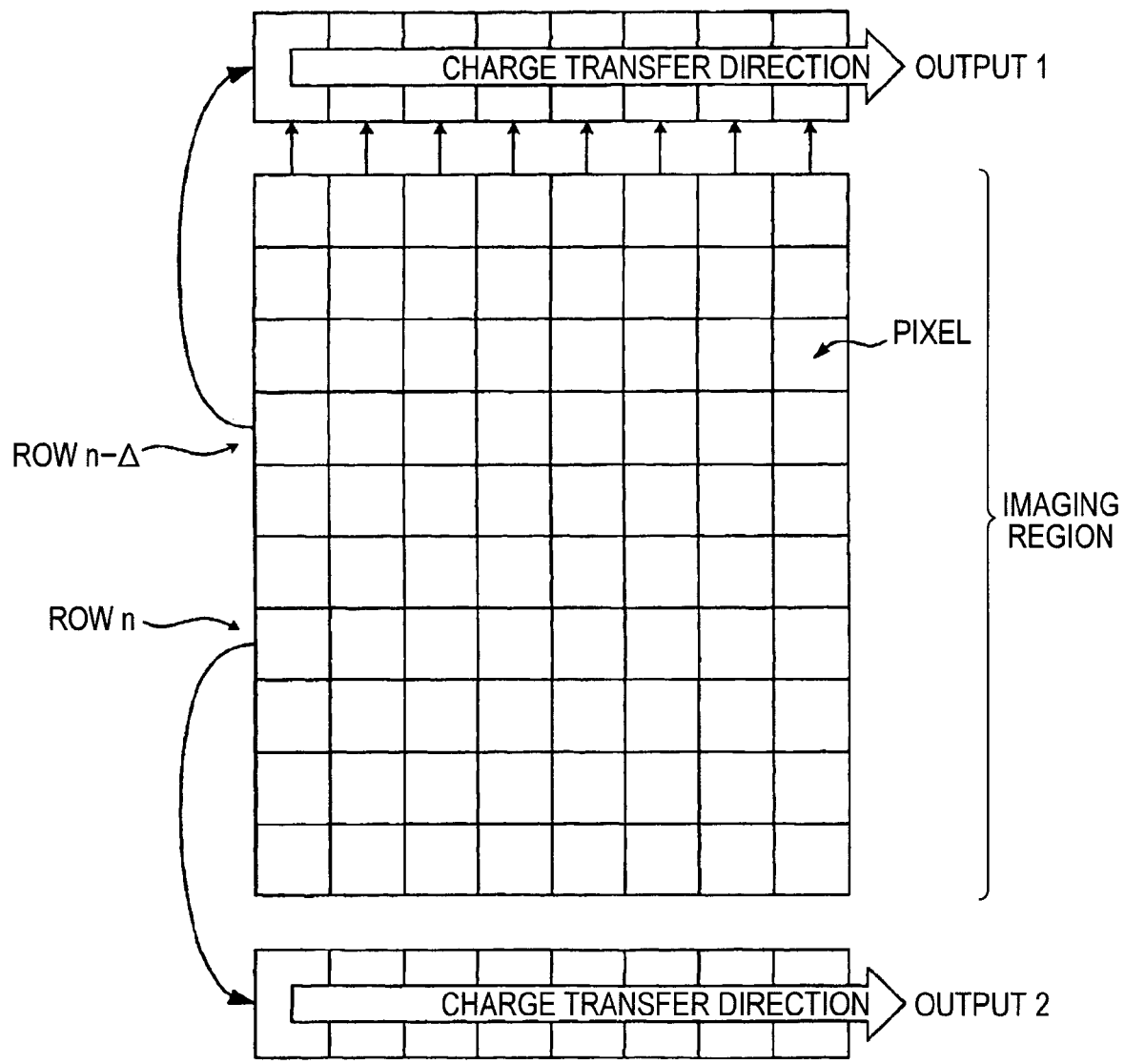
FIG. 12 illustrates the method for increasing the dynamic range of the related art.

In this case, if, for example, the difference processing is performed, as shown in FIG. 11C, an addition circuit for adding the output Qup (positive value) of the up counter circuit and the output Qdown (negative value) of the down counter circuit is required. In this case, an addition circuit is provided for each AD converter formed of a comparator and a counter. Thus, the wiring length can be small, and an increase in noise, the current, or the power consumption caused by data transfer can be prevented.

In any of the configurations shown in FIGS. 11A, 11B, and 11C, an instruction to operate the down counter circuit and the up counter circuit can be given by the communication/timing controller 20, as in the above-described embodiments. The down counter circuit and the up counter circuit can be both operated by the count clock CK0.

In the foregoing embodiments, NMOS or PMOS unit pixels disposed in a matrix are used in a sensor. However, the sensor is not restricted to this type, and a line sensor may be used, in which case, operations and advantages similar to those of the above-described embodiments can be achieved.

In the above-described embodiments, as a solid-state imaging apparatus that can selectively read signals from desired unit pixels by address control, a CMOS sensor provided with a pixel portion that generates signal charge by receiving light is used. The generation of signal charge is not restricted to light, but may be to electromagnetic waves in general, such as infrared, ultraviolet, or X rays. The above-described features disclosed in the foregoing embodiments can be applied to a semiconductor device having unit elements in which many devices for outputting an analog signal in accordance with the quantity of electromagnetic waves are disposed.

Although in the above-described embodiments the square unit pixels 3 are disposed, the arrangement of the unit pixels 3 are not restricted to a square lattice, and may be an oblique lattice in which the pixel portion 10 shown in FIG. 1 is obliquely tilted at 45 degrees.

Although in the foregoing embodiments the shape of the unit pixels 3 when viewed from the top is a square, it is not restricted to a square, and may be a hexagon (honeycomb). In this case, the arrangement of the unit pixels 3 is as follows such that one unit pixel column and one unit pixel row each includes a plurality of unit pixels.

A plurality of unit pixels forming an even-numbered column are displaced in the column direction from a plurality of unit pixels forming an odd-numbered column by about ½ of the pitch between unit pixels in each unit pixel column. Similarly, a plurality of unit pixels forming an even-numbered row are displaced in the row direction from a plurality of unit pixels forming an odd-numbered row by about ½ of the pitch between unit pixels in each unit pixel row. Each unit pixel column includes unit pixels only in the odd-numbered rows or in the even-numbered rows.

Row control lines 15 are provided for reading the pixel signals based on the signal charge accumulated in the charge generators of the unit pixels 3 to the column processor 26. The row control lines 15 are arranged around the honeycomb unit pixels 3 in a meandering manner. In other words, when viewed from the top, in hexagon spaces formed by disposing the row control lines 15 in a honeycomb shape, the unit pixels 3 are disposed. With this arrangement, on the whole, pixel signals can be read vertically while the unit pixels are displaced by about ½ pitches therebetween.

By arranging the unit pixels 3 and the row control lines 15 in a honeycomb shape, the surface element density can be improved while preventing a decrease in the area of the light-receiving surface of the charge generator of each unit pixel 3.

If the pixel portion 10 is compatible with color imaging, regardless of the shape or arrangement of the unit pixels 3, the pixels 3 should be selected so that the same color components are subjected to the product-sum operation. That is, based on the arrangement of color filters of a color separation filter, the positions of a plurality of unit elements are specified so that a plurality of unit signals subjected to the product-sum operation have the same color filter.

It is not essential that the AD conversion circuits discussed as an example of data processors having a function of generating wide dynamic range image signals in the above-described embodiments be provided by being integrated in a solid-state imaging apparatus or another electronic apparatus. The AD conversion circuits may be singly provided as ICs (Integrated Circuits), AD conversion modules, or data processing modules having a product-sum operation function of performing an operation between a plurality of pixels, in particular, having a function of performing addition computation for a plurality of image signals having different accumulation periods.

In this case, the AD conversion circuits (or data processors) including comparators and counters may be provided. Alternatively, they may be integrated into an IC or a module formed of a combination of individual chips in which a reference signal generator for generating an AD conversion reference signal and supplying it to the comparators and a controller for controlling the counting operation modes in the counters are mounted on the same semiconductor substrate.

By providing the AD conversion circuits into an IC or a module, when implementing a function of generating wide dynamic range images, the functions required for controlling the operations of the comparators and the counters can be collectively handled, thereby facilitating the handling or management of the components. Additionally, since the elements required for AD conversion are integrated as an IC or a module, the manufacturing of solid-state imaging apparatuses or other electronic apparatuses as finished products can be facilitated.

AS described above, according to the present invention, an image signal to be processed is compared with a reference signal for AD conversion, and simultaneously with this comparison processing, the counting operation is performed in one of the down-counting mode and the up-counting mode, and the count value when the comparison processing is finished is stored.

In this case, the digital data for one of the plurality of image signals is set as the initial value for the counting operation for the other image signal. Accordingly, multi-level digital data representing the computation result based on a plurality of image signals can be obtained as the counting result. Since AD conversion is conducted by the comparison processing and the counting operation, a mechanism for simultaneously executing the AD conversion and computation can be constructed. The control operation of the accumulation periods and the readout operation can be performed by a normal imaging device, and thus, the type of sensor device that can be used for implementing the present invention is not restricted.

That is, the type of sensor device is not restricted, and AD conversion is conducted on a signal by operating the AD conversion reference signal, and at the same time, the addition operation by using a plurality of signals is performed. As a result, the multi-level count value, which is the AD conversion result, can be obtained as the product-sum operation result.

Image signals obtained under the condition of different accumulation periods are subjected to computation, and in a mode having the same sign as digital data for one image signal, the counting operation is performed for the other image signal, and the count value when the comparison processing is finished is stored. Since the image signals have been obtained under the condition of different accumulation periods, a digital image signal having a wide dynamic range can be obtained as the counting result.

Accordingly, AD conversion for image signals and the generation of wide dynamic range image signals can be efficiently performed without restricting the type of imaging device. Accordingly, an image having a wide dynamic range in accordance with the light quantity while suppressing the overexposed highlight or the underexposed shadow can be obtained without increasing the circuit scale. That is, the provision of additional circuits, such as a dedicated memory device for storing AD converted data or a function for performing addition computation, other than the AD converters formed of comparators and counters, is not necessary, thereby reducing the circuit scale or the circuit area.

What is claimed is:

1. An image processing method for obtaining digital data comprising:
   reading a first charge and a second charge generated by a charge generator;
   generating a first analog signal and a second analog signal from the first charge and second charge;
   generating and retaining digital data corresponding to the first analog signal as an initial value for a counting operation for the second analog signal;
   comparing the second analog signal with an analog-digital (AD) conversion reference signal produced, independently of said second analog signal, by a reference signal generator;
   performing a counting operation in a mode selected between down-counting mode and up-counting mode while the comparing step is being performed; and
   storing a count value.

2. The image processing method according to claim 1, further comprising the steps of:
   comparing an electric signal corresponding to the first analog signal with the AD conversion reference signal for obtaining the digital data for the first analog signal,
   performing the counting operation in one of the down-counting mode and the up-counting mode while the comparison processing is being performed,
   storing a count value when the comparison processing is finished, and
   setting the digital data as the initial value.

3. The image processing method according to claim 1, further comprising the step of switching between the down-counting mode and the up-counting mode of the counting operation by switching a processing mode of an up/down counter.

4. The image processing method according to claim 1, further comprising the step of adjusting a coefficient for the plurality of analog signals based on an amount by which the AD conversion reference signal is changed over time.

5. The image processing method according to claim 4, wherein the amount by which the AD conversion reference signal is changed over time is adjusted for the analog signals obtained under a condition of a comparatively short accumulation period.

6. A semiconductor device for detecting a physical quantity distribution comprising:
   a plurality of unit elements disposed in a predetermined order, each of the unit elements includes a charge generator for generating charge signals;
   a unit signal generator for generating a first analog signal and a second analog signal from a first charge and a second charge generated by the charge generator;
   a comparator for comparing the second analog signal with an analog-digital (AD) conversion reference signal produced, independently of said second analog signal, by a reference signal generator; and
   a counter for performing a counting operation for the second analog signal by using digital data corresponding to the first analog signal as an initial value for the counting operation,
   wherein,
   the counting operation is performed in a mode selected between a down-counting mode and an up-counting mode while the comparison processing by the comparator is being performed, and the counter stores a count value when the comparison processing performed by the comparator is finished.

7. The semiconductor device according to claim 6, further comprising an accumulation period controller for controlling the accumulation periods.

8. The semiconductor device according to claim 6, further comprising a mode controller for controlling the mode of the counting operation performed by the counter.

9. The semiconductor device according to claim 7, wherein:
   the accumulation period controller controls the accumulation periods in the charge generators of the unit elements located at the same position so as to sequentially output the plurality of analog image signals obtained under the condition of different accumulation periods from the charge generators of the unit elements located at the same position, and
   the comparator and the counter perform corresponding processing for the plurality of analog image signals whose accumulation periods are controlled and which are sequentially output from the charge generators of the unit elements located at the same position.

10. The semiconductor device according to claim 7, wherein:
    the unit elements are disposed in a matrix, wherein a plurality of sets of the comparator and the counter are arranged in a row direction,
    the accumulation period controller controls the accumulation periods in units of
    rows, and
    the comparator and the counter perform corresponding processing for the plurality of image signals in the same column whose accumulation periods are controlled in units of rows.

11. The semiconductor device according to claim 6, wherein the counter includes a counter circuit for switching between the down-counting mode and the up-counting mode.

12. The semiconductor device according to claim 6, wherein:
    the comparator compares an electric signal corresponding to the first image signal with a AD conversion reference signal for obtaining the digital data for the first image signal, and
    the counter performs the counting operation in one of the down-counting mode and the up-counting mode while the comparison processing is being performed, and stores a count value when the comparison processing is finished, thereby obtaining the digital data for the first analog signal and setting the digital data as the initial value.

13. An electronic apparatus comprising:

a charge generator for generating charge signals;

a reference signal generator for generating an analog-digital (AD) conversion reference signal, wherein said reference signal is used to convert each of a plurality of analog image signals corresponding to the charge signals into digital data, and said reference signal is generated independently of said plurality of analog image signals;

a comparator for comparing each of the analog image signals with the AD conversion reference signal;

a counter for (a) performing a counting operation for a second image signal of the plurality of analog image signals, by using digital data for a first image signal of the plurality of analog image signals as an initial value, the counting operation being performed in a mode while the comparison processing is being performed by the comparator, and (b) storing a count value when the comparison processing is finished; and a mode selector for selecting the mode having the same sign as the sign of the digital data for the first image signal between a down-counting mode and an up-counting mode for the counting operation by the counter.

* * * * *